United States Patent
Hunt

(10) Patent No.: US 11,165,581 B2
(45) Date of Patent: *Nov. 2, 2021

(54) SYSTEM FOR IMPROVED IDENTIFICATION AND AUTHENTICATION

(71) Applicant: Mimecast Services Ltd., London (GB)

(72) Inventor: Simon Hunt, Bexleyheath (GB)

(73) Assignee: Mimecast Services Ltd., London (GB)

( * ) Notice: Subject to any disclaimer, the term of this patent is extended or adjusted under 35 U.S.C. 154(b) by 21 days.

This patent is subject to a terminal disclaimer.

(21) Appl. No.: 16/751,693

(22) Filed: Jan. 24, 2020

(65) Prior Publication Data

US 2020/0162255 A1 May 21, 2020

Related U.S. Application Data

(63) Continuation-in-part of application No. 16/574,535, filed on Sep. 18, 2019.

(60) Provisional application No. 62/741,601, filed on Oct. 5, 2018.

(51) Int. Cl.
| | |
|---|---|
| *H04L 9/32* | (2006.01) |
| *G06K 7/14* | (2006.01) |
| *H04L 29/06* | (2006.01) |
| *G06F 21/31* | (2013.01) |

(52) U.S. Cl.
CPC ............ *H04L 9/3213* (2013.01); *G06F 21/31* (2013.01); *G06K 7/1417* (2013.01); *H04L 9/3226* (2013.01); *H04L 9/3228* (2013.01); *H04L 9/3231* (2013.01); *H04L 9/3234* (2013.01); *H04L 9/3271* (2013.01); *H04L 63/083* (2013.01); *H04L 63/0853* (2013.01); *H04L 63/0861* (2013.01); *H04L 63/102* (2013.01)

(58) Field of Classification Search
CPC ... H04L 9/3213; H04L 9/3228; H04L 9/3231; H04L 63/102; H04L 9/3226; H04L 9/3234; H04L 9/3271; H04L 63/083; H04L 63/0853; H04L 63/0861; G06K 7/1417; G06F 21/31

See application file for complete search history.

(56) References Cited

U.S. PATENT DOCUMENTS

| | | |
|---|---|---|
| 6,965,968 B1 | 11/2005 | Touboul |
| 7,058,822 B2 | 6/2006 | Edery et al. |
| 7,418,731 B2 | 8/2008 | Touboul |
| 7,647,633 B2 | 1/2010 | Edery et al. |
| 8,141,154 B2 | 3/2012 | Gruzman et al. |
| 9,602,853 B2 * | 3/2017 | Naggar .............. H04N 21/4826 |
| 10,057,240 B2 * | 8/2018 | Mihaylov ........... H04L 63/0815 |
| 10,182,044 B1 * | 1/2019 | Praus ...................... H04L 63/08 |
| 10,277,628 B1 | 4/2019 | Jakobsson |
| 10,609,073 B2 | 3/2020 | Jakobsson |
| 2004/0187018 A1 * | 9/2004 | Owen ..................... H04L 9/321 |
| | | 713/184 |
| 2007/0169189 A1 * | 7/2007 | Crespo ................ H04L 63/0807 |
| | | 726/20 |

(Continued)

*Primary Examiner* — Jason Chiang

(74) *Attorney, Agent, or Firm* — Nutter McClennen & Fish LLP

(57) ABSTRACT

The present disclosure relates generally to computer security and human-computer interaction, and, more particularly, to systems and methods for providing improved user authentication and verification techniques by way of credential-less or near credential-less user input.

20 Claims, 24 Drawing Sheets

Registration Session

(56) References Cited

U.S. PATENT DOCUMENTS

| | | | | |
|---|---|---|---|---|
| 2008/0256617 | A1* | 10/2008 | Cartwell | G06F 21/34 |
| | | | | 726/9 |
| 2010/0262834 | A1* | 10/2010 | Freeman | G06F 21/33 |
| | | | | 713/184 |
| 2011/0197266 | A1* | 8/2011 | Chu | H04L 9/3228 |
| | | | | 726/5 |
| 2011/0289572 | A1* | 11/2011 | Skeel | H04L 63/083 |
| | | | | 726/7 |
| 2013/0047227 | A1* | 2/2013 | Schultz | G06F 21/31 |
| | | | | 726/7 |
| 2014/0143078 | A1* | 5/2014 | Meehan | G06Q 20/204 |
| | | | | 705/21 |
| 2014/0189359 | A1* | 7/2014 | Marien | H04L 9/3234 |
| | | | | 713/172 |
| 2014/0201536 | A1* | 7/2014 | Fiske | H04L 9/3228 |
| | | | | 713/183 |
| 2014/0259108 | A1* | 9/2014 | Clark | H04L 63/08 |
| | | | | 726/3 |
| 2015/0058950 | A1* | 2/2015 | Miu | H04L 63/08 |
| | | | | 726/7 |
| 2015/0112862 | A1* | 4/2015 | Kheradpir | G06Q 20/34 |
| | | | | 705/44 |
| 2015/0242852 | A1* | 8/2015 | Goldstone | G06Q 20/12 |
| | | | | 705/44 |
| 2016/0219039 | A1* | 7/2016 | Houthooft | H04W 12/068 |
| 2016/0248752 | A1* | 8/2016 | Blinn | H04L 63/0838 |
| 2016/0350751 | A1* | 12/2016 | Keys | G06F 21/6245 |
| 2017/0148009 | A1* | 5/2017 | Perez Lafuente | H04L 63/0846 |
| 2018/0351944 | A1* | 12/2018 | Cho | H04L 9/3271 |
| 2020/0112560 | A1 | 4/2020 | Hunt | |

* cited by examiner

Sandboxed Single Sign-On
(Initial Sign-On)

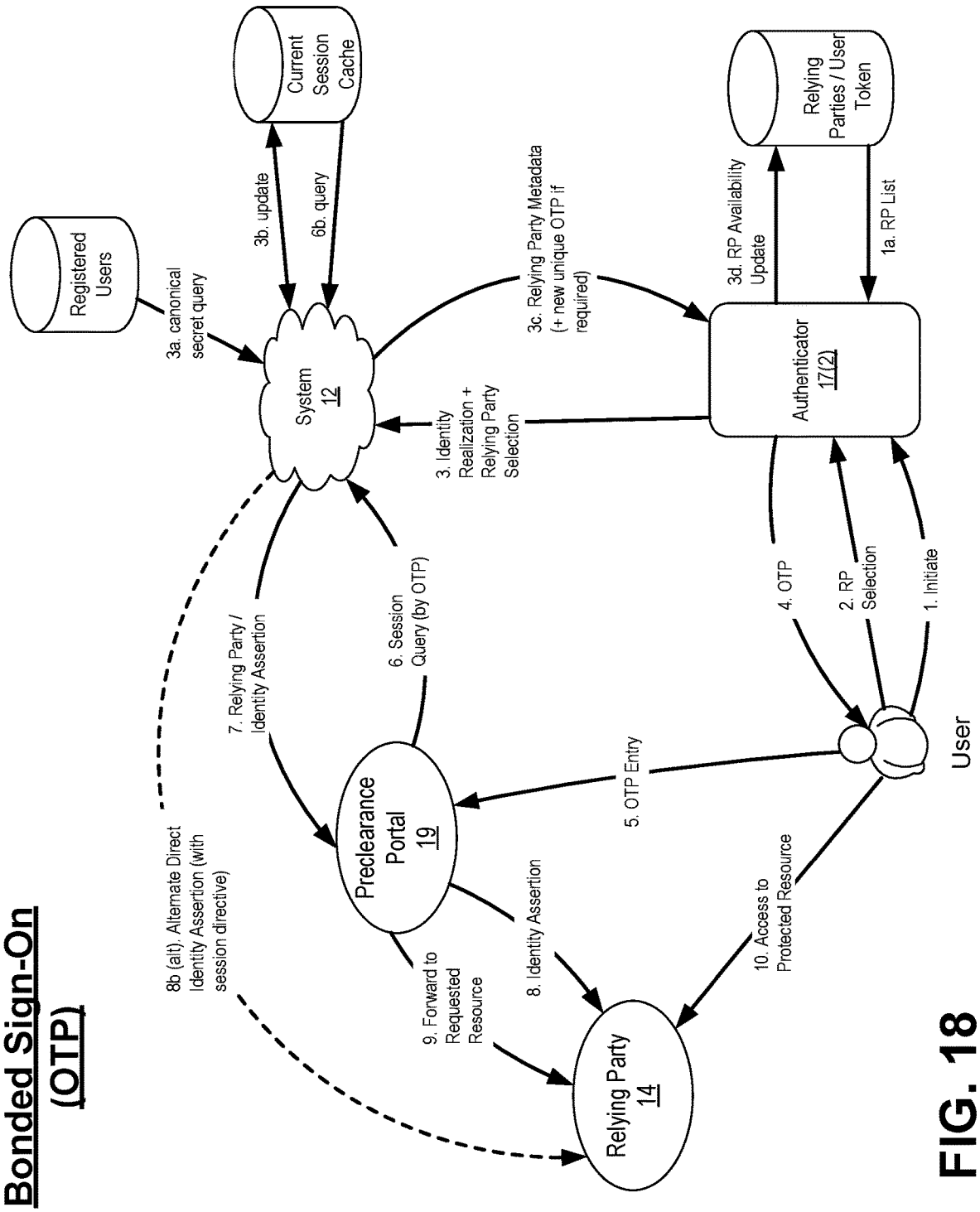

SYSTEM FOR IMPROVED IDENTIFICATION AND AUTHENTICATION

CROSS-REFERENCE TO RELATED APPLICATIONS

This application is a continuation-in-part of U.S. patent application Ser. No. 16/574,535, filed Sep. 18, 2019, which claims the benefit of, and priority to, U.S. Provisional Application No. 62/741,601, filed Oct. 5, 2018, the content of which is hereby incorporated by reference herein in its entirety.

FIELD

The present disclosure relates generally to computer security, and, more particularly, to systems and methods for providing credential-less or near credential-less authentication and verification techniques.

BACKGROUND

Computer security, cybersecurity, or information technology security (IT security) is the protection of computer systems from theft or damage to their hardware, software or electronic data, as well as from disruption or misdirection of the services they provide. The field is growing in importance due to increasing reliance on computer systems, the Internet and wireless networks such as Bluetooth and Wi-Fi, and due to the growth of "smart" devices, including smartphones, televisions and the various tiny devices that constitute the Internet of Things (IoT).

Most modern security systems and computer applications utilize some form of authentication technology. Authentication is the process of determining whether someone or something is, in fact, who or what it declares itself to be. Authentication is important because it enables individuals and organizations alike to keep data secure by permitting only authenticated users (or processes) to access protected resources, which may include computer systems, networks, databases, websites and other network-based applications or services.

User authentication is the verification of an active human-to-machine transfer of credentials required for confirmation of a user's authenticity. User authentication is performed in almost all human-to-computer interactions other than guest and automatically logged in accounts. Authentication authorizes human-to-machine interactions on both wired and wireless networks to enable access to networked and Internet-connected systems and resources.

Traditionally, user authentication has consisted of a simple user identification (user ID) and password combination. Authenticating a user with a user ID and a password is typically considered the most basic type of authentication, and it depends on the user knowing just two pieces of information: the user ID and the password. For example, during a login process, the user must provide a username and password in order to gain access to protected computing devices, operating systems, applications (e.g., email, web sites, etc.), databases, networks, etc.

Though passwords have been an accepted norm for authenticating users and providing access for many years, the conventional user ID and password authentication technique has proven inadequate in light of on-going technology-based advances in identity theft. For example, passwords are vulnerable to phishing or key-logging attacks by imposters, hacking or network sniffing, and even guessing by trial and error. Once exposed, user files and applications are open to undetected theft by copying as well as vandalism by deletion. Moreover, the entire account may be exposed at once because individually protecting each file and application with a unique password is not practical. Conventional encryption techniques to protect user files and applications are similarly vulnerable, especially when a cryptographic key is stored at an end point.

In order to combat the ongoing security threats, some systems have instituted increasing strength requirements for passwords. For example, users may be required to provide intricate and more complex passwords that include a combination of numbers, case-sensitive letters, and non-traditional and special characters. Requiring ever more complex passwords may improve security, but such passwords are generally difficult for the user to memorize, which may result in a user storing complex passwords in files, which are then also vulnerable. Also, it is very common for a user to have a single, default password so that they do not have to memorize and protect a slew of passwords. However, use of a single password is not recommended because all accounts are vulnerable to a single password interception. Moreover, even the most complex passwords are vulnerable to interception attacks, such as a man-in-the-middle attack or a keyboard sniffer.

Using layered security and multiple factors of authentication is gaining ground as a more secure method authentication to prevent fraud. Adding authentication factors to the authentication process typically improves security. Strong authentication (via multi-factor authentication) usually refers to authentication that uses at least two or more factors, where those factors are of different types. An authentication factor represents some piece of data or attribute that can be used to authenticate a user requesting access to a system. The main authentication factors are knowledge, possession and inherence. Knowledge factors include all things a user must know in order to log in, including user names, passwords, personal identification numbers (PINs), personal-related information specific to the user, such as mother's maiden name, first pet name, place of honeymoon, or other responses, for example. Possession factors consist of anything a user must have in their possession in order to log in, which may include one-time password tokens as key fobs or smartphone apps, employee ID cards and SIM card-based mobile phones. Inherence factors may include any inherent traits the user has that are confirmed for login, such as biometrics (retina scans, iris scans, fingerprint scans, finger vein scans, facial recognition, voice recognition, hand geometry, and earlobe geometry, to name a few).

Two-factor authentication, for example, has improved the state of the art by requiring a user provide a knowledge factor (user ID and password) combined with a second authentication factor, either a possession factor or an inherence factor. For instance, a two-factor authentication technique may require the user to demonstrate possession of something, such as a smart phone, in addition to their user ID and password, where the user may be required to enter a verification code received via text message on a preregistered mobile phone, or a code generated by an authentication application. Three-factor authentication uses three authentication factors, usually a knowledge factor (password) combined with a possession factor (security token) and inherence factor (biometric). Systems that call for those three factors (knowledge, possession, and inherence) plus a location (geographic) or a time factor are considered examples of four-factor authentication.

Although multi-factor authentication is clearly superior to the conventional user ID and password combination, it is imperfect. In particular, multi-factor authentication (two-factor authentication, three-factor authentication, etc.) may be a nuisance for users because it requires more effort and involvement on the user's part, which may lead to attempts to minimize its frequency, possibly compromising its efficacy. Accordingly, the reliability of authentication is affected not only by the specific technologies and the manner in which they are implemented, but also the number of factors involved and subsequent burden imposed on the user.

SUMMARY

Traditional authentication depends on the use of a password file, in which user IDs are stored together with hashes of the passwords associated with each user. When logging in, the password submitted by the user is hashed and compared to the value in the password file. If the two hashes match, the user is authenticated. This approach to authentication has several drawbacks, particularly for resources deployed across different systems. For one thing, attackers who are able to access to the password file for a system can use brute force attacks against the hashed passwords to extract the passwords. Also, this approach would require multiple authentications for modern applications that access resources across multiple systems. Password-based authentication weaknesses have been addressed to some extent with stronger user names and password rules like minimum length and stipulations for complexity, such as including capitals and symbols. The recent implementation of layered security and multiple factors of authentication has addressed drawbacks of the conventional user ID and password authentication, but presents its own drawbacks. In particular, the additional effort and involvement required from a user to confirm each of the additional factors may be a nuisance, which may lead to attempts to minimize its frequency, possibly compromising its efficacy.

The present invention addresses the drawbacks associated with current authentication techniques. More specifically, the present invention provides a secure and easy-to-use authentication system that relies on a single trusted device associated with a user, such as a smartphone or other personal computing device, to facilitate strong and usable multi-factor authentication. The use of a single trusted device provides an alternative and secure approach for authenticating users, without requiring the typical exchange of a user-entered credential, such as the traditional combination of username and password, at the time of authentication. The authentication approaches of the present invention are at least as strong as conventional multi-factor authentication techniques, while being at least as easy to use as the traditional user ID and password combination.

For example, upon performing certain registration steps with the authentication system, a user's device will be established and recognized by the authentication system as a bonded or trusted device that is specific to the user. The system may rely upon an existing trusted credential for a one-time secure registration process of the device in order to establish the device as a bonded or trusted device. As part of registration of the device, one or more additional authentication factors may be linked with the bonded device. The additional authentication factors may include, but are not limited to, a QR code, a PIN, or a biometric factor (e.g., fingerprint, retina, or facial scan, or voice and/or speech recognition). It should be noted that there are a wide variety of possible factors that can be used with the present system, in conjunction with the bonded device and the following description is not limited to the authentication factors noted previously herein. Once registered, the bonded device can be relied upon as a required proof of identity for authentication purposes so as to grant user access to a protected resource without requiring that the user enter a username or other identifying information, such as an email address or the like, in order to gain access. Accordingly, one of the main advantages of the present invention is that there is no need for a user to provide the typical identifying information (i.e., username or ID) for all future authentication sessions, thereby avoiding the pitfalls of traditional authentication, in which user-provided information could be retained in a device's history, and/or recorded by a keylogger or other malware.

For example, a user may wish to gain access to a protected resource, which may include computer systems, networks, databases, websites and other network-based applications or services having secure data. The protected resource may be referred to as a relying party. The relying party utilizes, or otherwise relies upon, an access/session management system which generally serves as an identity provider and an authentication authority. In particular, the access/session management system may generally provide initial registration services, as well as ongoing authentication services to ensure that any user attempting to access the relying party resources is in fact a recognized and trusted user. It should be noted that the relying party may also be referred to herein as a service provider, which more specifically describes a relying party that is configurable by a user to use the user's choice of an access/session management system, while the relying party may generally refer to an entity that is external to the access/session management system that relies on the access/session management system alone to establish an authentication assertion. The relying party (service provider) may include any entity that has an online presence (i.e., available for a user to access via an online account) and provides some form of access to, data, which the relying party protects via authentication and authorization processes, namely authentication services provided by the access/session management system.

Upon a user attempting to access and initiate a session with the relying party via a personal computing device, such as a PC, tablet, or even a smartphone, the relying party may communicate with the access/session management system indicating that an attempt has been made to access the relying party resources. For example, a user may navigate, via their computing device, to a relying party website, at which point, the user will be provided with a user interface associated with the access/session management system.

In the event that the user is not yet registered (i.e., the user and/or computing device is not recognized), the user will need to register with the access/session management system services (a requirement in order to access the relying party resources). In one embodiment, the user may be invited to complete registration, in which the user may be prompted to provide certain information and credentials as part of the initial registration. Such information may include, but is not limited to basic information, including name, mailing address, email address, phone number, and the like, and may further include login credentials, such as username and password. It should be noted that, in some embodiments, an administrator associated with the relying party may previously initiate user registration with the access/session management system by simply registering the user's phone number and/or email address, for example. As such, once the user attempts to login, they will be prompted to provide their phone number and/or email address, which, upon successful entry, will be matched with the data provided by their administrator, thereby verifying identity.

Accordingly, at this point, the user is then invited to install certain access/session management system software application(s) on a personal computing device that the user chooses to be used for authentication/verification purposes, such as a smartphone or other device such as a dedicated piece of authentication hardware or a personal laptop. The access management software application may include user agent(s) to be used for completing the registration process and used in future authentication sessions (i.e., future sessions or events in which the user is authenticated and granted access to the protected resource(s)). Upon installation, an additional registration phase is initiated, which involves the formation of a seed secret specific to that user and the associated smartphone which is based, at least in part, on a Time-based One-time Password (TOTP) algorithm, such as the Internet Engineering Task Force standard RFC 6238, for example. In particular, this phase of the registration process involves a peer-to-peer exchange of secrets among parties involved, including the access/session management system, the user, and the relying party. The registration session essentially relies on a bond of trust, in which each party has the shared secret such that either party can authenticate the other. The access/session management system's role as a trusted agent and intermediary in the exchange ensures the registration process is secure.

For example, in one embodiment, the user's smartphone may include a user agent in the form of a code generator (provided via the access/session management system software) running natively on the smartphone. An introduction or initial candidate secret is generated, via the access/session management system, and conveyed to the user's smartphone. This initial candidate secret is intended to be relayed to the code generator, either by displaying machine-readable data, in the form of a QR code, for example, or some other communicative means (via email or SMS text messaging service which contains a link to the chosen device, and then opened with the code generator). The user then actively scans the QR code or selects the link, and, in turn, a reciprocal secret is transmitted back to the access/session management system. The access/session management system updates a user's profile with reciprocation against the user credentials that the smartphone was originally registered to and further transmits a canonical secret back to the smartphone. The canonical secret generally comprises two pieces of data, including a token, which includes built-in expiry date in which the user has a grant period during which they can carry out authentication as determined by organization/enterprise, as well as a random confirmation code (e.g., six-digit code), so as to avoid fly-by scan by a passerby or a person looking to steal identity (displayed on the smartphone) and which must be entered during the registration period.

The token is stored on the smartphone and used for authentication purposes in future sessions. In particular, the smartphone may be used as a token repository, wherein the token replaces the need to provide credentials (i.e., username and password) for any future logins when the users wishes to access the protected resource. For example, as a result of the reciprocal process (i.e., reciprocal, peer-to-peer exchange of secrets), a bonded or trusted personal computing device (i.e., the user's smartphone) is established and registered to the specific user. Future authentication sessions will take place each time a user attempts to access protected resources associated with that specific relying party. More specifically, authentication sessions will build on the tripartite contract of the three parties (the access/session management system, the user, and the relying party) to reaffirm multi-factor authentication in real time. In other words, there is essentially a three-way conversation occurring during an authentication process, in which one party communicates with another party, which then shares secret(s) with another party to complete an authentication loop (i.e., the access/session management system directly communicates with both the user and the relying party, sharing secrets therebetween, while the user and relying party generally do not communicate directly with one another). Accordingly, the access/session management system serves as a trusted agent and intermediary in the exchange of information between all parties.

In some embodiments, the authentication process may include a multi-part, unidirectional data transfer between the three parties for a secure authenticated session. The first instance is in the form of a request session, in which the relying party, upon a user attempting to access and initiate a session with the relying party, requests a unique authentication session of the access/session management system. The session information may include a public component, which serves as tender for a subsequent realization session (e.g., the public component is made available for an as-yet unknown user agent of the computing device to "realize" a user's identity or the like), and a private component, which is a token shared between the access/session management system and the relying party to establish provenance, and is required by any exchange of status information for the session. The next part of the authentication process includes a detect session, in which the user agent of the smartphone detects the public session identifier through some mechanism (i.e., such as scanning a QR code displayed via a user interface of a computer monitor, providing biometric input, such as fingerprint scan or spoken phrase, or inputting a PIN). A realize session follows, in which the user agent informs the access/session management system that the session is being realized by a pre-registered user, and sends identifying secrets for that specific user. The final part of the authentication session includes an enquire session, in which the relying party determines the status of a session by enquiring the access/session management system. The session is identified by the public component, and the request must also include the private component to establish provenance. Upon a successful authentication, a user is able to progress on to relying party's interface and access protected resource that relying party is offering.

It should be noted that once a trusted or bonded device has been established, other authentication factors can be added. A bonded device may generally refer to a device that essentially holds a single user's registration details and verified, completed reciprocation, and that has been issued a token to use the authentication services for an agreed period. The additional authentication factor may include, but is not limited to, a QR code, a PIN, or a biometric factor (e.g., fingerprint, retina, or facial scan, or voice and/or speech recognition). For example, in some embodiments, voice and/or speech recognition may be used, such that, instead of QR code for authentication, certain words derived from a secret and a TOTP may be used. For example, upon attempting access to a protected resource, a number of words may be displayed to the user, thereby prompting the user to narrate, via their smartphone, the displayed words to gain access to the protected resource. In other embodiments, a specific question could be displayed to the user, thereby prompting the user to speak and provide a verbal answer to the question. Upon successful narration or verbal response, the user may gain access to the protected resource. The voice recognition system is configured to not only correlate the spoken words with the displayed words to ensure a correct match (i.e., provide speech recognition functions), but further perform voice recognition by correlating the spoken words with a stored voiceprint profile of the user to ensure that an authorized user is truly the one attempting to gain access.

As a result of the reciprocal process (i.e., reciprocal, peer-to-peer exchange of secrets), a bonded or trusted device (i.e., the user's smartphone) is established and registered to the specific user. This act of reciprocation for forming a trust bond overcomes the drawbacks of current systems and methods. The promotion of a dual session during registration creates a trust environment and forms a common secret never shown in public and never shared again during future authentication sessions. In particular, authentication carried out via the given bonded device naturally supports a multi-factor authentication paradigm (something the user owns, together with the biometric or PIN authentication) without requiring any direct manual credential entry on the user's part, either a username or password. Furthermore, the bonded device is not required to be linked directly to the computer on which they authenticate via any mechanism (such as NFC, Bluetooth, Wifi or by USB cable) nor does the bonded device communicate with the relying party, but instead relies on a secure, time-synchronized token exchange with the access/session management system. Accordingly, the present invention provides a secure and easy-to-use system for employing a single chosen device (such as a smartphone) as sole required device needed for proof of identity for all future authentication purposes, thereby providing credential-less or near credential-less authentication and verification techniques. In particular, the bonded device is used to establish the initial user context for future authentication sessions.

Accordingly, one of the main advantages of the present invention is that there no need for a user to provide the typical identifying information (i.e., username or ID) for all future authentication sessions, thereby avoiding the pitfalls of traditional authentication. In other words, establishing the bonded device essentially replaces the need for a user to provide some sensitive, identifying information, specifically a username or ID, thereby protecting against phishing. The bonded device is used, in conjunction with the access/session management system authentication services, to establish initial user context during authentication sessions, in which the user is never required to enter their username or ID, but is able to complete realization of an authentication session and provide a password and/or other factors that may be required (i.e., SMS/TOTP verification or the like) to complete authentication and ultimately gain access. The benefit of this approach is that the username may not be intercepted and/or is never revealed, thereby making it difficult to exploit a password, even if it were known. Another benefit is that a password can then be validated against the never-revealed username, and so might still use a third party credentialing system on the backend, which ensures the user has knowledge aforethought of the current password, and so benefits from the password change policies enforced on that backend system.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 18 is a block diagram illustrating one embodiment of a One-time Password (OTP)-based bonded sign-on method, depicting use of a bonded device to carry out a portion of a sign-on process utilizing an OTP consistent with the present disclosure.

Figure 1:
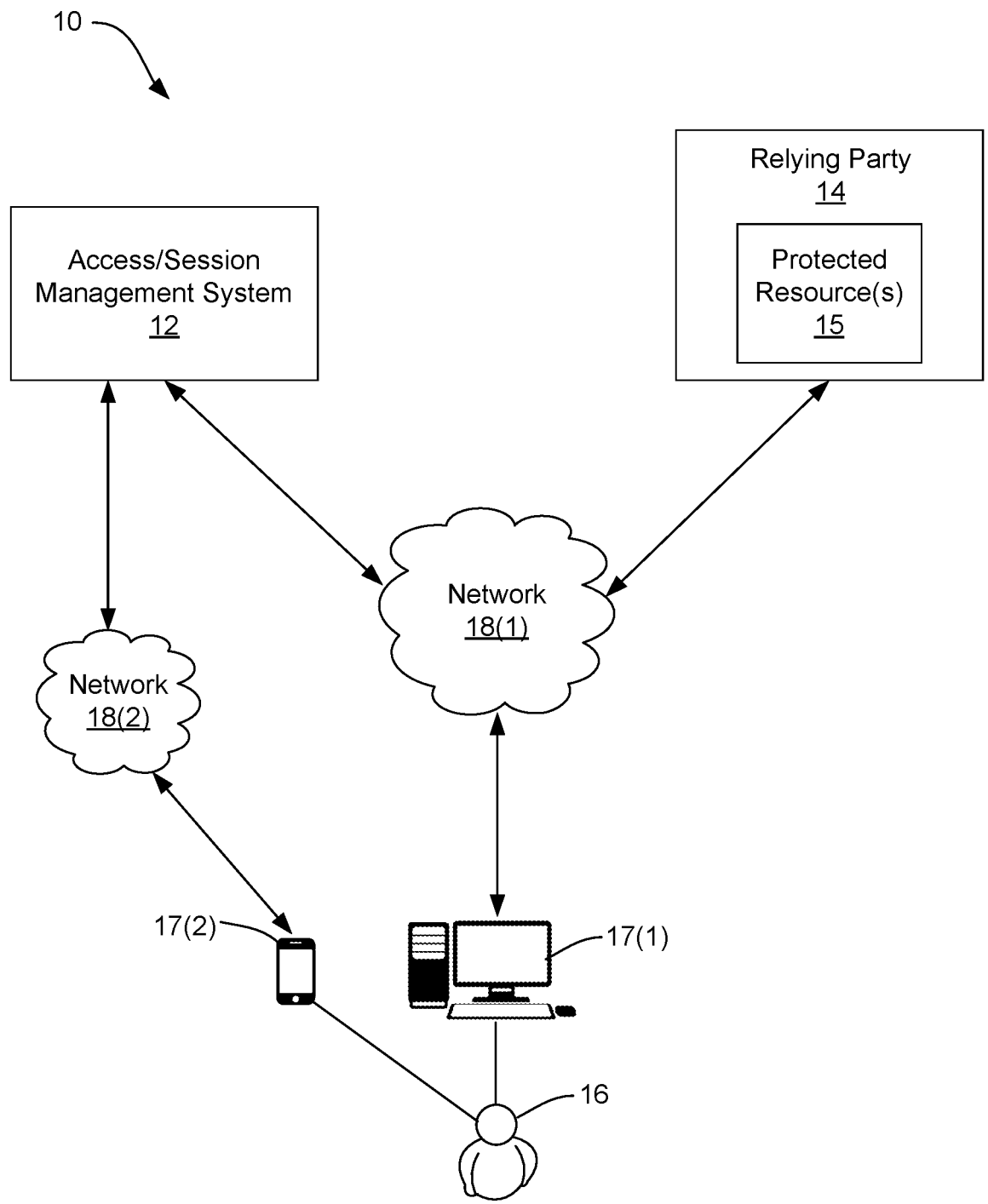
FIG. 1 is a block diagram illustrating an authentication system consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to a secure and easy-to-use authentication system for employing a single chosen user device, such as a smartphone, as the sole required device needed for proof of identity for authentication purposes for granting user access to a protected resource after an initial, one-time secure registration process. The system utilizes an existing trusted credential for a one-time secure registration process linked with an additional authentication factor, such as a QR code, a PIN, or a biometric factor (e.g., fingerprint, retina, or facial scan, or voice and/or speech recognition).

Traditionally, username and password combinations have been used to authenticate a user logging into a secure system such as a website. This technique is fraught with problems. For example, this authentication technique relies on a user having to remember their password. Sometimes systems place certain constraints on passwords in an effort to make the system more secure (e.g. requiring a certain number of characters, certain types of characters, etc.) and, while such constraints may be helpful to make the system more secure, they may also make the created password more difficult for a user to remember.

Additionally, password-based authentication is also susceptible to attack. For example, keylogging software may be installed on a device by a hacker or fraudster and may be used to secretly monitor keystrokes, including passwords. Since passwords are often sent from one computer to another (e.g. from the computer that a user is typing the password on to a computer which receives the password to authenticate the user), passwords are also susceptible to a sniffing attack (e.g., capture and analysis of packets of data flowing over a network). For example, packet sniffing software may be used by a fraudster connected to a user's Wi-Fi network to capture passwords sent by the user over the network.

Passwords are also susceptible to an attack directed at the secure system itself. For example, a brute force attack consists of an automated hacker program constantly attempting logins using a single user-name and millions of password combinations. There are numerous examples in recent history where a hacker has gained access to a secure system through vulnerabilities such as newly discovered weaknesses in security applications (such as openSSL), causing the secure system to request that users change their passwords.

The present invention addresses the drawbacks associated with current authentication techniques, including the traditional user ID and password authentication approach as well as newer multi-factor authentication techniques. In particular, the systems and methods of the present invention provide alternative and secure approaches for authenticating users, without requiring the typical exchange of a user-entered credential, such as a password and/or username, at the time of authentication. The authentication approaches of the present invention are at least as strong as multi-factor authentication techniques, while being at least as easy to use as the traditional user ID and password combination.

FIG. 1 is a block diagram illustrating one embodiment of an exemplary system or architecture 10 consistent with the present disclosure. As shown, the system 10 includes an access/session management system 12 providing authentication services for a relying party 14. More specifically, the access/session management system 12 provides alternative and secure approaches for authenticating a user 16, without requiring the typical exchange of a user-entered credential, such as a password and/or username, at the time of authentication.

The access/session management system 12 may be embodied on an internet-based computing system/service, such as a cloud-based service, for example. The access/session management system 12 is configured to communicate and exchange data with the relying party 14, as well as one or more computing devices 17(1) and 17(2) associated with a user 16 over one or more networks 18(1) and 18(2). In the present context, the user 16 may include any person attempting to access protected resource(s) 15 provided by, or otherwise associated with, the relying party 14. The access/session management system 12 generally provides authentication and verification services for the relying party 14 so as to authenticate the user (i.e., verify the supposed identity of the user) in the event that the user attempts to access one or more protected resources 15 associated with the relying party 14.

Each of the networks 18(1) and 18(2) may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected networks upon which various applications or service run including, for example, the World Wide Web). In alternative embodiments, the communication path between any one of the computing devices 17(1), 17(2), the access/session management system 12, and the relying party 14, may be, in whole or in part, a wired or wireless connection.

Each of the networks 18(1) and 18(2) may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), any version of IEEE 802.11 transmission protocol standards, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, each of the networks 18(1) and 18(2) may be or include a single network, and in other embodiments each of the networks 18(1) and 18(2) may be or include a collection of networks.

It should be noted that cryptographic protocols, designed to provide communications security over each of the networks 18(1) and 18(2), may be relied upon in the present system at all times. For example, transport layer security (TLS) and/or secure sockets layer (SSL) encryption protocols may be used to secure all communications between the access/session management system 12, the relying party 14, and the one or more computing devices 17(1) and 17(2) associated with the user 16 over the networks 18(1) and 18(2).

As shown, the system 10 may include at least a first network 18(1) over which the access/session management system 12, relying party 14, and client computing device 17(1) (represented as a desktop PC) generally communicate and a second network 18(2) separate from the first network 18(1) over which the access/session management system 12 and the mobile computing device (i.e., smartphone or other mobile device) 17(2), which becomes a bonded device, communicate with one another. Accordingly, in some embodiments, the bonded device does not need to be connected to either of the client computing device 17(1) or the relying party 14 in order to communicate and exchange information with the access/session management system 12, as it relies on a separate, secondary network 18(2). As described in greater detail herein, this configuration strengthens the overall architecture of the authentication system 10, as the bonded device 17(2) does not transmit nor receive anything to or from the relying party 14 or the client computing device 17(1) (which initially accesses the relying party 14). Rather, the bonded device 17(2) communicates only with the access/session management system 12 directly, thereby decreasing the risk of security breach.

Figure 2:
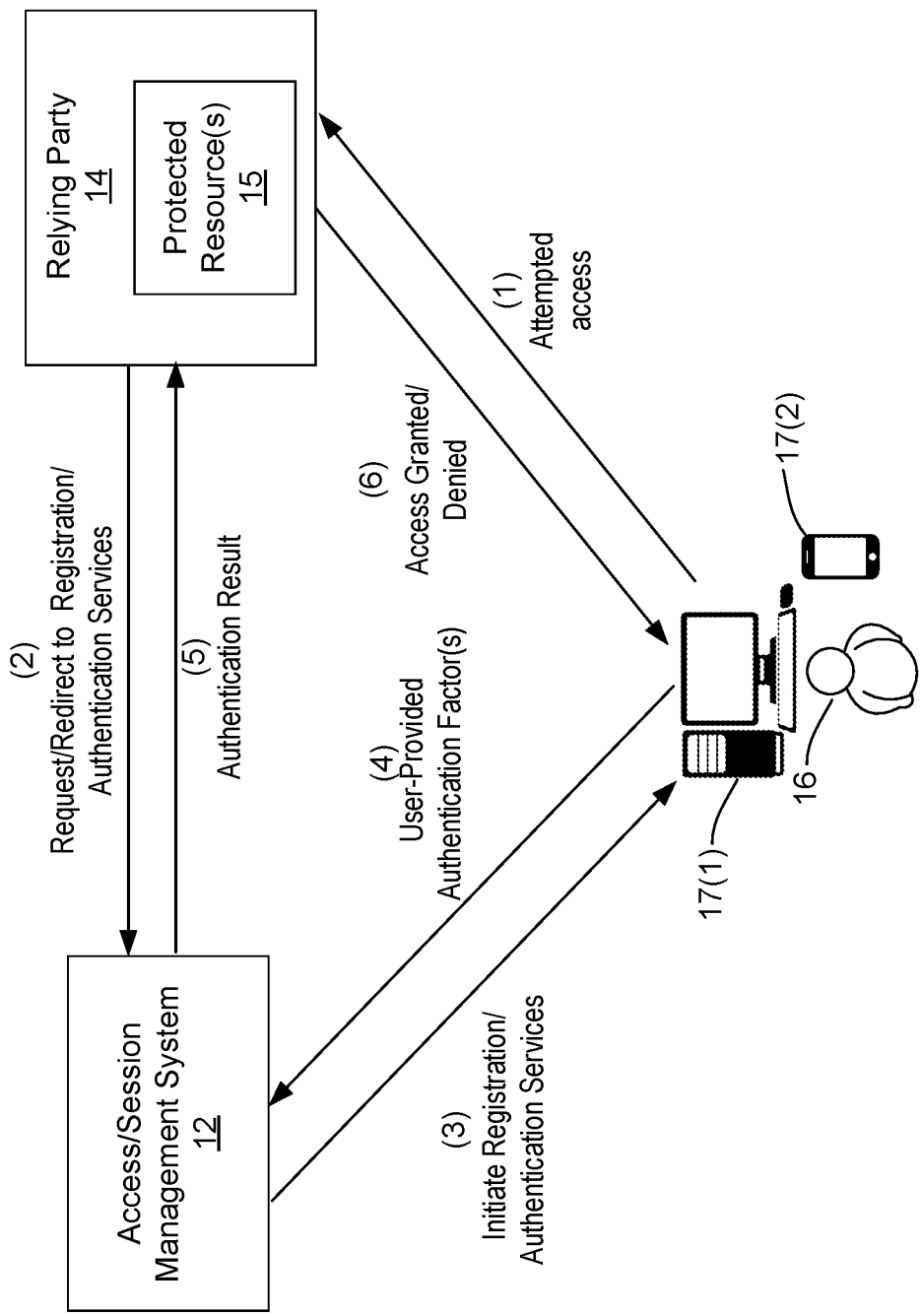
FIG. 2 is a block diagram illustrating a general flow of the registration and authentication processes in accordance with the present invention.

FIG. 2 is a block diagram illustrating a general flow of the registration and authentication processes in accordance with the present invention. For example, a user 16 may wish to gain access to a protected resource 15, which may include computer systems, networks, databases, websites and other network-based applications or services having secure data. In the illustrated embodiment, the protected resource 15 is available via a relying party 14. The relying party 14 utilizes the access/session management system 12, which generally serves as an identity provider and an authentication authority. In particular, the access/session management system 12 may generally provide initial registration services, as well as ongoing authentication services to ensure that any user 16 attempting to access the relying party's resources is in fact a recognized and trusted user.

It should be noted that the relying party may also be referred to herein as a service provider, which more specifically describes a relying party that is configurable by a user to use the user's choice of an access/session management system, while the relying party may generally refer to an entity external to the access/session management system that relies on the access/session management system alone to establish an authentication assertion. The relying party (service provider) may include any entity having an online presence (i.e., available for a user to access via an online account) and providing some form of access to data, which the relying party protects via authentication and authorization processes, namely authentication services provided by the access/session management system.

In some embodiments, a user 16 may attempt to access and initiate a session with the relying party via a personal computing device 17(1). In the event that the relying party 14 is employing the authentication services provided by the access/session management system 12, the relying party 14 may then communicate with the access/session management system 12 indicating that an attempt has been made to access the relying party's protected resources. For example, a user 16 may navigate, via their computing device 17(1), to a relying party website, at which point, the user 16 may automatically be redirected to a user interface associated with the access/session management system 12. It should be noted that the relying party 14 utilizes the access/session management system services for authenticating a user (i.e., verifying that the user is in fact who they claim to be) prior to granting access to any protected resources hosted by the relying party 14. In other words, the relying party 14 employs those services provided by the access/session management system 12 and trusts the authentication provided by the access/session management system 12 prior to granting access to a user.

The access/session management system 12 may then initiate either a registration session or an authentication session with the user 16 depending on whether the user 16 is already registered with the access/session management system services. In the event that the user 16 is not registered (i.e., the user and/or computing device is not recognized), the user 16 will need to register with the access/session management system services (a requirement in order to access the relying party resources) via an initial registration session, which will be described in greater detail herein. In the event that the user 16 is already registered (i.e., the user and/or computing device is recognized), the access/session management system 12 carries out an authentication session, in which a chosen user device, such as a smartphone 17(2), which was initially registered and established as a trusted or bonded device, is used as proof of identity for authentication purposes (i.e., the user is not required to provide a username or ID, such as their email address or name) but rather need only interact with their smartphone 17(2) to provide a separate requested authentication factor(s) during the authentication session. In other words, the bonded device, once registered, essentially provides secure confirmation of the user's identity (i.e., replaces the need for the user to provide their username or ID), thereby obscuring the user identity and preventing exposure to phishing attacks, while still allowing for the user to provide at least one additional credential (i.e., password, PIN, biometric data, etc.). Upon receipt of the user-provided authentication factor(s), the access/session management system 12 provides the authentication results to the relying party 14 and, based on those results, the relying party 14 may, or may not, grant the user 16 access to the protected resource(s) 15.

Figure 3:
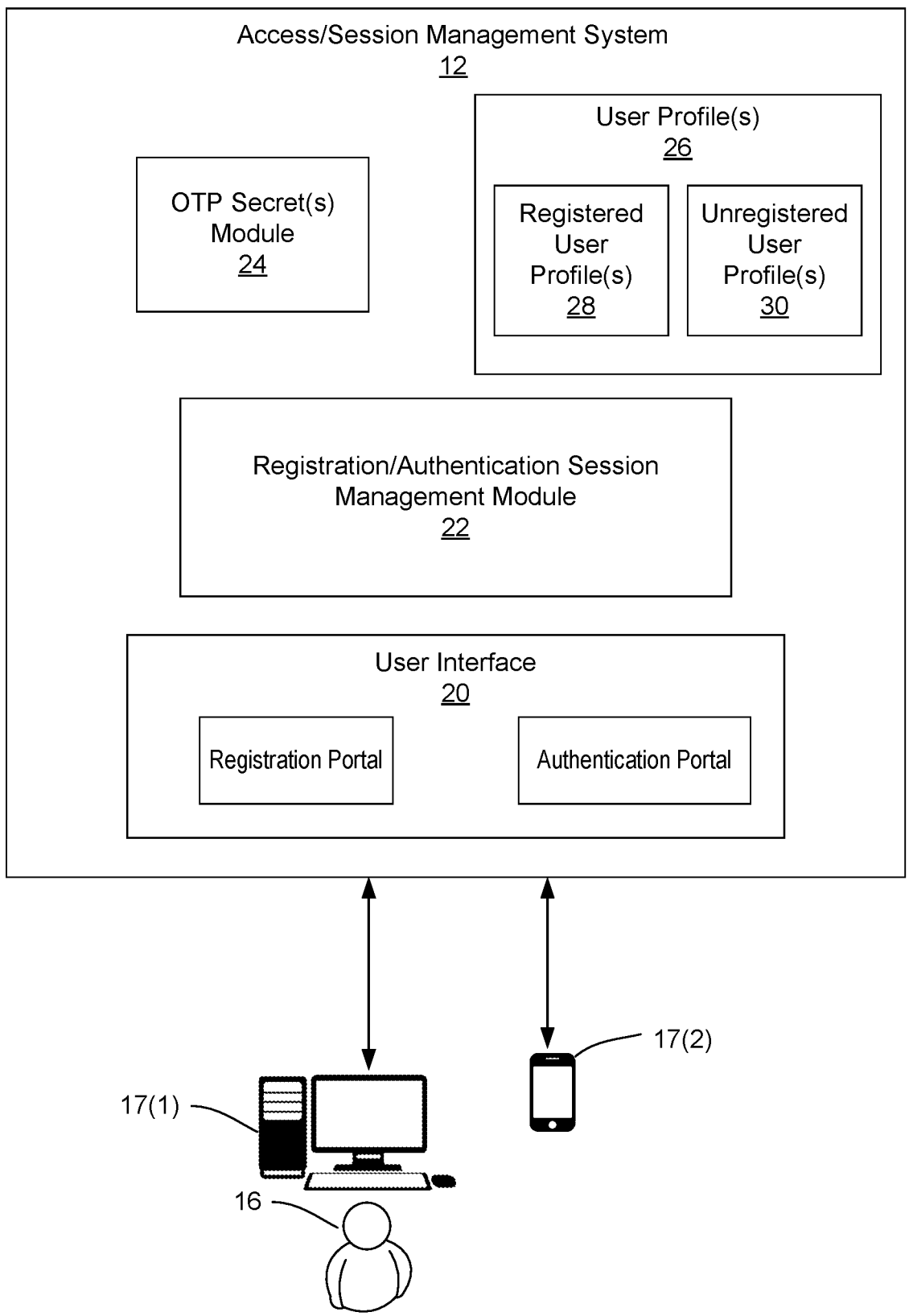
FIG. 3 is a block diagram illustrating the access/session management system in greater detail.

FIG. 3 is a block diagram illustrating the access/session management system 12 in greater detail. The access/session management system 12 includes a user interface 20, which, depending on the state of the user (i.e., registered or unregistered) will provide the user 16, via a display on the user's computing device(s) 17(1), 17(2), either a registration portal or an authentication portal providing the respective session. The access/session management system 12 further includes a registration/authentication session management module 22, which essentially carries out the registration and authentication sessions by way of managing the collection and transmission of data (i.e., data exchange) and the initialization of the registration and authentication sessions. The access/session management system 12 further includes a one-time password (OTP) module 24. OTP, also known as one-time PIN or dynamic password, is a password that is valid for only one login session or transaction, on a computer system or other digital device. In the instant application, the OTP module 24 may be used for the generation of secrets to be sent to the user during the registration session as part of a peer-to-peer exchange of secrets between the access/session management system 12 and the chosen personal computing device (i.e., smartphone 17(2)) to be registered as the bonded device for all future authentication sessions. The access/session management system 12 may further include, or have access to, one or more databases or repositories, most notably for storing user profiles 26. The user profile database may include registered user profiles 28 and unregistered user profiles 30. The user profiles include user-specific data, such as, for example, basic information, including the user's name, mailing address, email address, phone number, and the like, and may further include login credentials, such as username and password. Post registration, a registered user profile 28 may further include a registered canonical secret created during the registration process which is specific to that user and further stored on the user's smartphone 17(2), as will be described in greater detail herein. Furthermore, additional user data may be stored within a user profiles, including, but not limited to, registered biometric data (fingerprint, retina, or facial scan, or voiceprint).

Figure 4A:
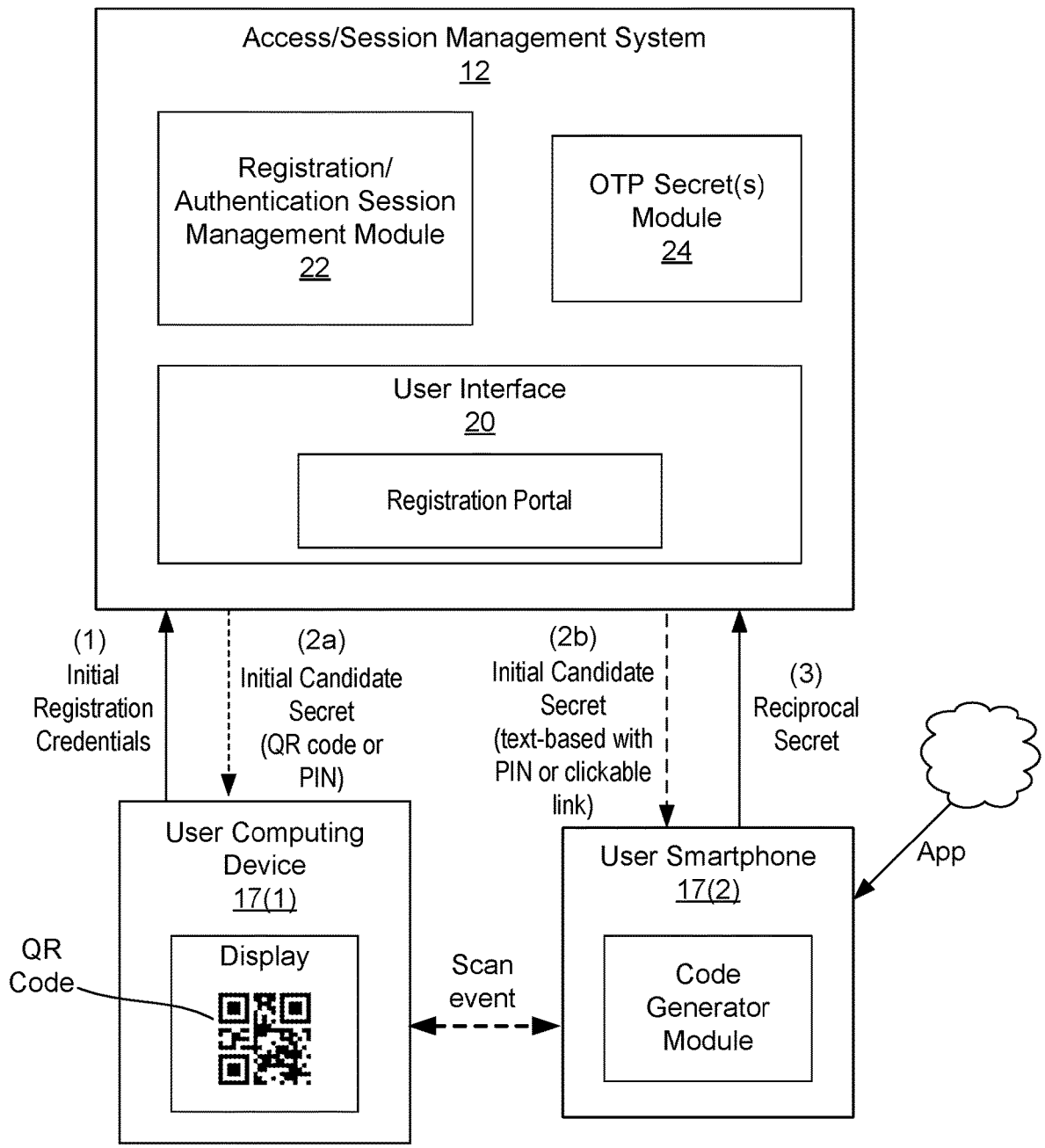
FIGS. 4A and 4B are block diagrams illustrating an exemplary registration session between a user computing device, a user smartphone, and the access/session management system for registering a user with access/session management system services, which is required in order to undergo future authentication sessions so as to access a relying party's protected resources.
Figure 4B:
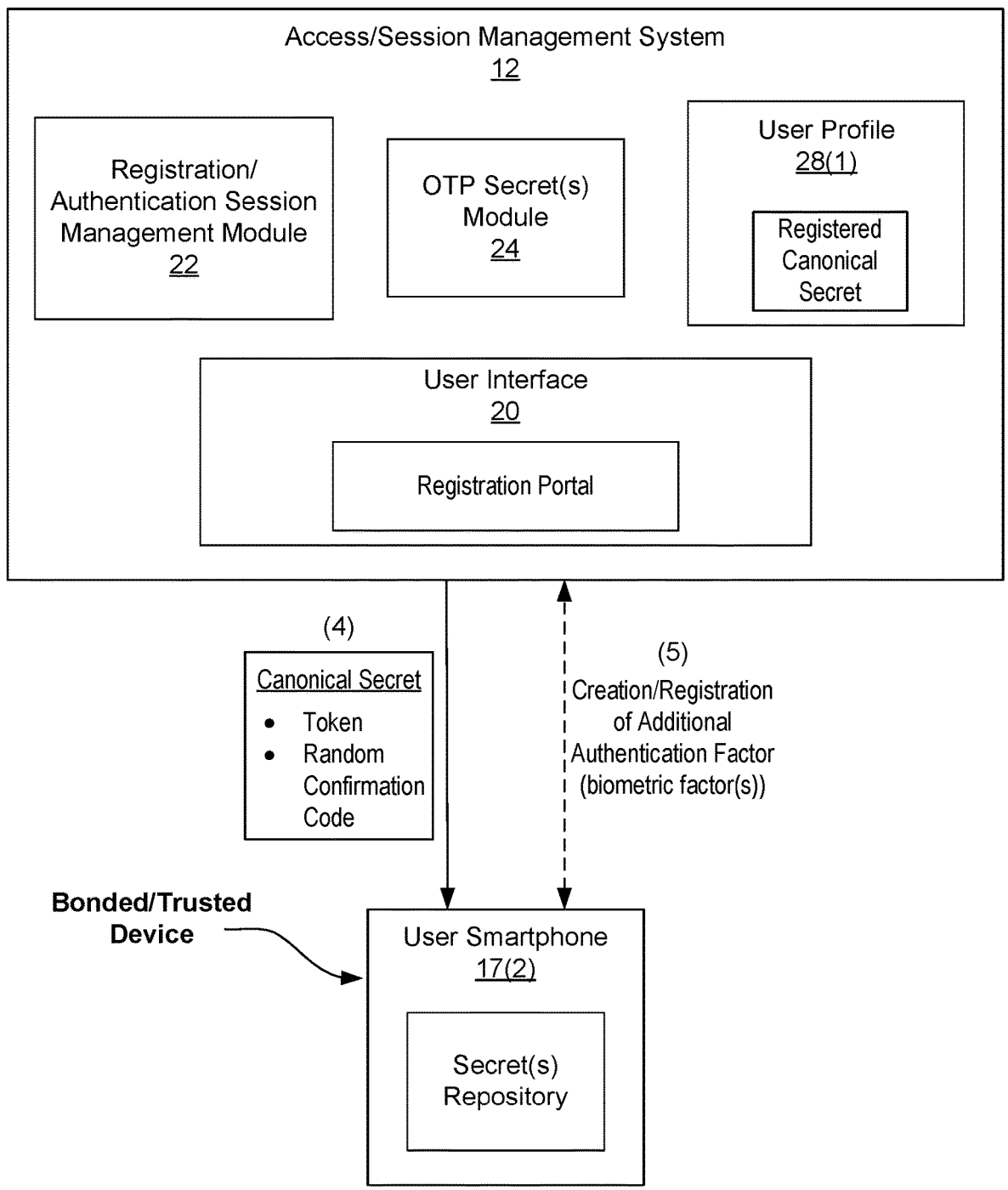

FIGS. 4A and 4B are block diagrams illustrating an exemplary registration session between a user computing device 17(1), a user smartphone 17(2), and the access/session management system 12 for registering a user with access/session management system services, which is required in order to undergo future authentication sessions so as to access a relying party's protected resources.

As previously described, upon a user attempting to access and initiate a session with the relying party 14 via a personal computing device 17(1), the relying party 14 may communicate with the access/session management system 12 indicating that an attempt has been made to access the relying party resources 15. For example, a user may navigate, via their computing device 17(1), to a relying party 14 website, at which point, the user may be redirected to a user interface 20 associated with the access/session management system 12.

In the event that the user is not yet registered (i.e., the user and/or computing device is not recognized by the access/session management system 12), the user will need to register with the access/session management system services (a requirement in order to access the relying party resources). In one embodiment, the user may be invited to complete registration, in which the user may be prompted to provide certain information and credentials as part of the initial registration. Such information may include, but is not limited to basic information, including name, mailing address, email address, phone number, and the like, and may further include login credentials, such as username and password. It should be noted that, in some embodiments, an administrator associated with the relying party 14 may previously initiate user registration with the access/session management system 12 by simply registering the user's phone number and/or email address, for example. As such, once the user attempts to login, they will be prompted to provide their phone number and/or email address, which, upon successful entry, will be matched with the data provided by their administrator, thereby verifying identity.

Accordingly, at this point, the user is then invited to install certain access/session management system software application(s) on a personal computing device that the user chooses to be used for authentication/verification purposes, such as a smartphone 17(2). The access management software application (hereinafter referred to as the "app") may include user agent(s) to be used for completing the registration process and used in future authentication sessions (i.e., future sessions or events in which the user is authenticated and granted access to the protected resource(s)). Upon installation, an additional registration phase is initiated, which involves the formation of a seed secret specific to that user and the associated smartphone which is based, at least in part, on a Time-based One-time Password (TOTP) algorithm. The TOTP algorithm is an extension of the HMAC-based One-time Password (HOTP) algorithm generating a one-time password by instead taking uniqueness from the current time. It has been adopted as Internet Engineering Task Force standard RFC 6238. In particular, this phase of the registration process involves a peer-to-peer exchange of secrets among parties involved, including the access/session management system 12, the user 16, and the relying party 14. The access/session management system's role as a trusted agent and intermediary in the exchange ensures the registration process is secure.

For example, in one embodiment, the user's smartphone 17(2) may include a user agent in the form of a code generator (provided via the access/session management system software) running natively on the smartphone. An introduction or initial candidate secret is generated, via the access/session management system 12, and conveyed to the user's smartphone. This initial candidate secret is intended to be relayed to the code generator, either by displaying machine-readable data, in the form of a QR code, for example, or some other communicative means (via email or SMS text messaging service which contains a link to the chosen device and then opened with the code generator). The user then actively scans the QR code (via the smartphone 17(2)) or selects the link (via the smartphone 17(2)), and, in turn, a reciprocal secret is transmitted back to the access/session management system 12. The QR code is an encapsulation of an otpauth URL with a specific extension for the reciprocation endpoint. This is distinguished from a conventional otpauth URL in that there is a "reciprocal" query parameter that contains an endpoint to which the client should send a plain-text reciprocal secret. The endpoint itself has a token in the path that holds an encryption of the user email address and account code, for example, which is used to verify the owner of the reciprocated secret. Once the user scans the QR code, a secret is sent to the endpoint in question.

The access/session management system 12 updates a user's profile with reciprocation against the user credentials that the smartphone 17(2) was originally registered to and further transmits a canonical secret back to the smartphone 17(2), which is the definitive secret to be used in future OTP code generation. The canonical secret generally comprises two pieces of data, including a token, which includes built-in expiry date in which the user has a grant period during which they can carry out authentication as determined by the organization/enterprise of the relying party, as well as a random confirmation code (e.g., six-digit code), so as to avoid fly-by scan by a passerby or a person looking to steal identity (displayed on the smartphone) and which must be entered during the registration period. The token is stored on the smartphone 17(2) and used for authentication purposes in future sessions. The above described process of generating a canonical secret may be referred to herein as a Reciprocal TOTP (RTOTP) scheme. As the canonical secret has been exchanged peer-to-peer, it is considered more secure than standard TOTP and ensures a bonded-device metaphor (i.e., the secret cannot co-exist on any other device, since reciprocation is allowed only once).

It should be noted that, in some embodiments, an additional aspect of the registration process is a key exchange (certificate exchange) between the access/session management system 12 and the smartphone 17(2) to thereby improve the security of registration. In particular, the system 10 may utilize public-key cryptography, or asymmetric cryptography, in which the smartphone 17(2) can generate a pair of keys: a public key and a private key, and send the public key to the access/session management system 12 while storing the private key on a hardware-backed keystore on the smartphone 17(2), which is described in greater detail herein with reference to FIG. 9. The system 10 can then rely on attestation for assertion that the public key is provided from a valid, secure hardware-backed keystore. The key exchange initiated by the user agent provides an additional security measure for the registration and authentication processes in that, there is a chance that a rogue malware agent on the smartphone 17(2) might access the canonical secret if the user agent software is not well written. That slight chance of security breach is effectively reduced to none by sending a public key from the smartphone 17(2) with a hardware-backed keystore (so the private key can never leave the smartphone 17(2) or even be accessed by app memory).

It should be noted that, in another embodiment, the registration process may be mediated mostly, or entirely, on the user agent of the smartphone 17(2). For example, a user may navigate to a relying party 14, as previously described, in which the relying party 14 receives a public QR code and access secret, as previously described, and, once determined that the user is not registered, the unregistered user installs the app and scans the typical session QR code as the relying party 14 sends "enquire-session" polling requests. At this point, the user agent has no prior reciprocation and thus sends a registration request directly to the access/session management system 12. The user agent will prompt the user for a user identifier (i.e., username or ID), in which the user will enter this information via their smartphone for the first and only time, together with any other additional credentials that the access/session management system 12 requires, such as a password and any preexisting authentication factors (i.e., biometric input, such as fingerprint scan, retina scan, voiceprint, etc.). It should be noted that, in some embodiments, additional steps may be required during the registration process, such as the access/session management system 12 sending a confirmation email if the identifier is expected to be an email address, with an activation link. In some embodiments, registration may also require an exchange of funds. The access/session management system 12 now responds with the user identifier to the relying party 14, who is still polling away with "enquire-session" in the background. The main advantage of this variant of the registration process is that no user identifier (i.e., username or ID) is transmitted between the smartphone 17(2) and the relying party 14, as the registration process only involves direct communication between the smartphone 17(2) and the access/session management system 12 (over the second network 18(2)). Accordingly, there is no need to display a separate registration UI on the same machine, even by redirection to authentication pages, thereby avoiding keylogging and/or phishing threats.

Figure 5:
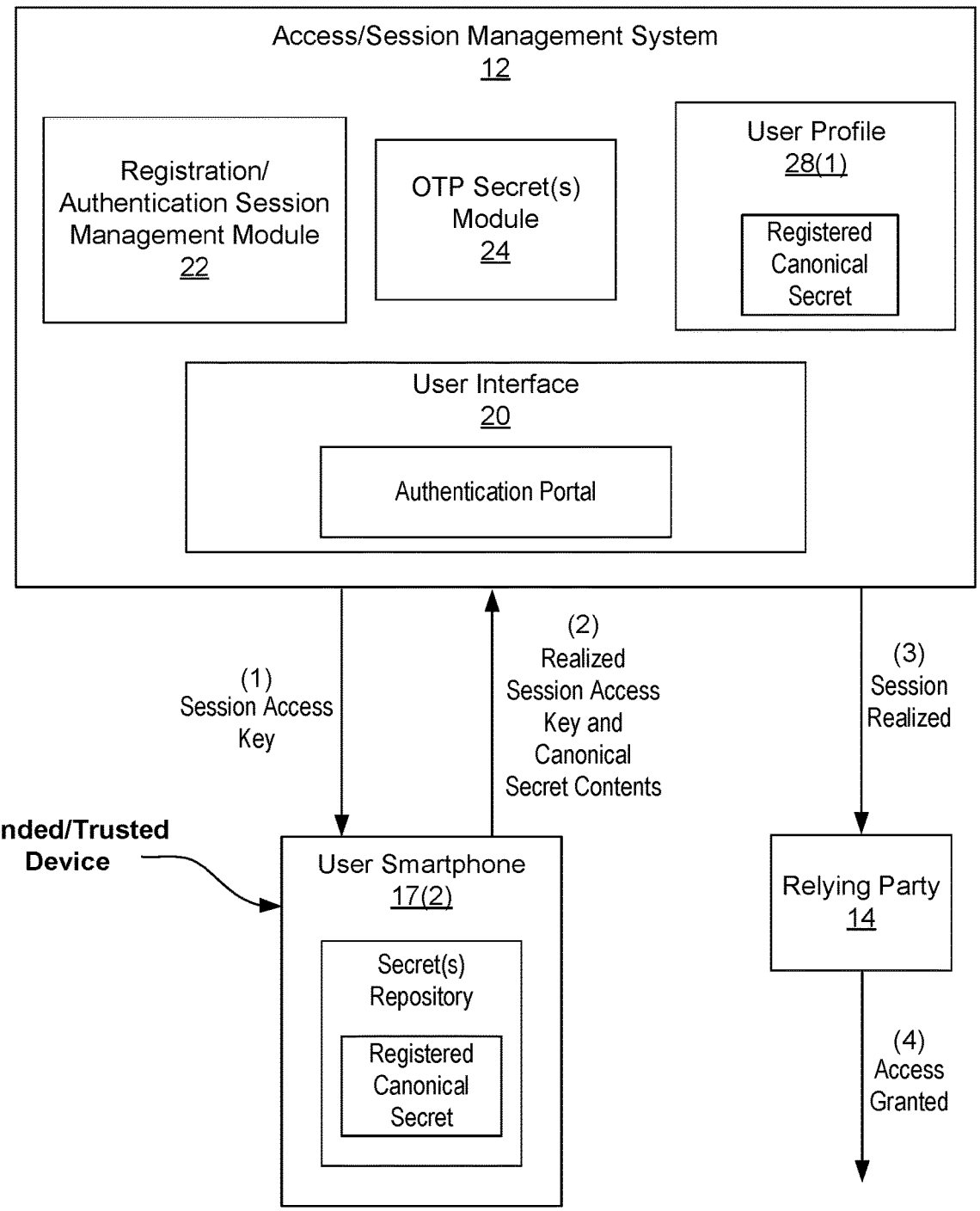
FIG. 5 is a block diagram illustrating an exemplary authentication session including a peer-to-peer exchange establishing a tripartite contract when all three parties establish secure exchange of expected information.

FIG. 5 is a block diagram illustrating an exemplary authentication session including a peer-to-peer exchange establishing a tripartite contract when all three parties establish secure exchange of expected information. In particular, the smartphone 17(2) may be used as a token repository, wherein the token replaces the need to provide credentials (i.e., username and password) for any future logins when the users wishes to access the protected resource. For example, as a result of the reciprocal process (i.e., reciprocal, peer-to-peer exchange of secrets), a bonded or trusted personal computing device (i.e., the user's smartphone) is established and registered to the specific user. Future authentication sessions will take place each time a user attempts to access protected resources associated with that specific relying party. More specifically, authentication sessions will build on the tripartite contract of the three parties (the access/session management system, the user, and the relying party) to reaffirm multi-factor authentication in real time. In other words, there is essentially a three-way conversation occurring during an authentication process, in which one party communicates with another party, which then shares secret(s) with another party to complete authentication loop.

In some embodiments, the authentication process may include a multi-part, unidirectional data transfer between the three parties for a secure authenticated session. The first instance is in the form of a request session, in which the relying party 14, upon a user 16 attempting to access and initiate a session with the relying party, requests a unique authentication session of the access/session management system. The session information may include a public component, which serves as a tender to realize (made available for an as-yet unknown user agent of the computing device to "realize"), and a private component, which is a token shared between the access/session management system and the relying party to establish provenance, and is required by any exchange of status information for the session. The next part of the authentication process includes a detect session, in which the user agent of the smartphone detects the public session identifier through some mechanism (i.e., such as scanning a QR code displayed via a user interface of a computer monitor, providing biometric input, such as fingerprint scan or spoken phrase, or inputting a PIN). A realize session follows, in which the user agent informs the access/session management system that the session is being realized by a pre-registered user, and sends identifying secrets for that specific user. The final part of the authentication session includes an enquire session, in which the relying party determines the status of a session by enquiring the access/session management system. The session is identified by the public component, and the request must also include the private component to establish provenance. Upon a successful authentication, a user is able to progress on to relying party's interface and access protected resource that relying party is offering.

It should be noted that once a trusted or bonded device has been established, other authentication factors can be added. The additional authentication factor may include, but is not limited to, a QR code, a PIN, or a biometric factor (e.g., fingerprint, retina, or facial scan, or voice and speech recognition). For example, in some embodiments, voice and/or speech recognition may be used, such that, instead of QR code for authentication, certain words derived from a secret and a TOTP may be used. For example, upon attempting access to a protected resource, a number of words may be displayed to the user, thereby prompting the user to narrate, via their smartphone, the displayed words to gain access to the protected resource. Upon successful narration, the user may gain access to the protected resource. The voice recognition system is configured to not only correlate the spoken words with the displayed words to ensure a correct match (i.e., provide speech recognition functions), but further perform voice recognition by correlating the spoken words with a stored voiceprint profile of the user to ensure that an authorized user is truly the one attempting to gain access.

As a result of the reciprocal process (i.e., reciprocal, peer-to-peer exchange of secrets), a bonded or trusted device (i.e., a smartphone) is established and registered to the specific user. This act of reciprocation for forming a trust bond overcomes the drawbacks of current systems and methods. The promotion of a dual session during registration creates a trust environment and forms a common secret never shown in public and never shared again during future authentication sessions. In particular, authentication carried out via the given bonded device naturally supports a multi-factor authentication paradigm (something the user owns, together with the biometric or PIN authentication) without requiring any direct manual credential entry on the user's part: either a username or password. Furthermore, the bonded device is not required to be linked directly to the computer on which they authenticate via any mechanism (such as NFC, Bluetooth, Wifi or by USB cable), but instead relies on a secure, time-synchronized token exchange with the access/session management system. Accordingly, the present invention provides a secure and easy-to-use system for employing a single chosen device (such as a smartphone) as sole required device needed for proof of identity for all future authentication purposes, thereby providing credential-less or near credential-less authentication and verification techniques.

Figure 6:
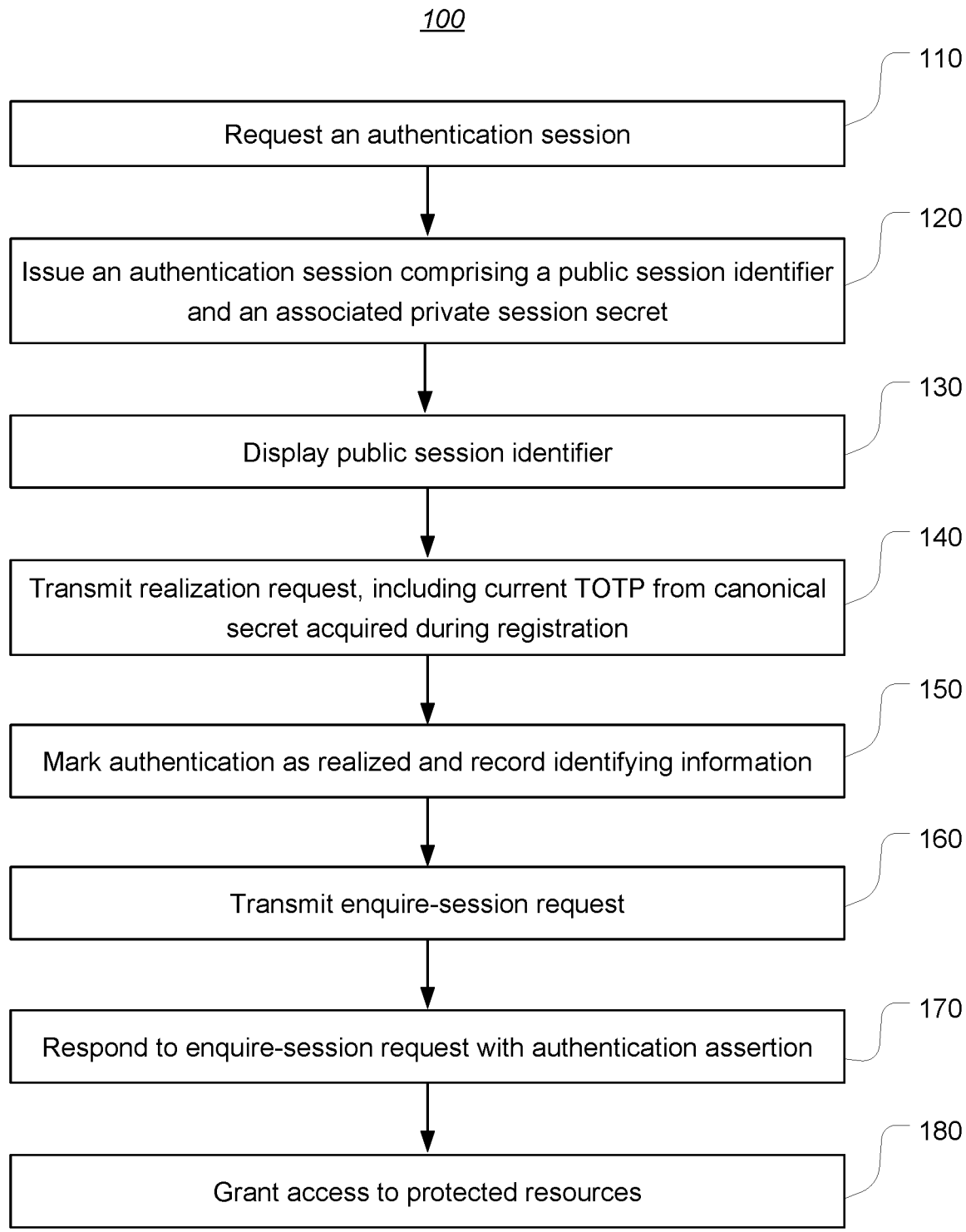
FIG. 6 is a flow diagram illustrating one embodiment of a method for authenticating a user via an authentication session request/enquire/realization process.

FIG. 6 is a flow diagram illustrating an embodiment of a method 100 for authenticating a user via an authentication session request/enquire/realization process. The method 100 includes the relying party 14 requesting an authentication session from the access/session management system 12 (operation 110). For example, a user 16 may attempt to access and initiate a session with the relying party 14, which may include a user 16 navigating to a relying party 14 user interface and requesting access to a protected resource. In this instance, the user 16 has previously completed the registration process and, in turn, is able to attempt to gain access via an authentication session (and subsequently gain access upon successful authentication). The relying party 14 may request an authentication session directly, or may forward the user interface to the authentication portal provided by the access/session management system 12 (where the session is requested directly). In response to the authentication session request, the access/session management 12 issues a session consisting of a public session identifier and an associated private session secret (operation 120). For example, the session information may include a public component, which serves as a tender to realize (made available for an as-yet unknown user agent of the computing device to "realize"), and a private component, which is a token shared between the access/session management system 12 and the relying party 14 to establish provenance, and is required by any exchange of status information for the session. In particular, the relying party 14, or authentication portal on behalf of the relying party 14, polls the access/session management system 12 with "enquire-session" requests for a given public session identifier, to thereby provide provenance of the relying party's right to enquire that particular session by virtue of the accompanying private session secret token.

The method 100 further includes displaying, via the relying party 14, a public session identifier (operation 130), which may include a QR code, a minimum three-word sequence (for voice identification), or other mechanism, that the user 16 is intended to either scan with, or dictate into, their registered smartphone 17(2). In turn, the user agent of the smartphone 17(2) detects the public session identifier via such event. The method 100 further includes transmitting, from the user agent of the registered smartphone 17(2), a realization request, including the current TOTP from the canonical secret acquired during registration (operation 140), thereby informing the access/session management system 12 that the session is being realized by a pre-registered user, and sends identifying secrets for that specific user 16. In turn, the access/session management system 12 marks the authentication as realized and records the user's identifying information for the particular relying party 14 in a short-lived cache or other repository (operation 150).

The relying party 14 continues to poll the access/session management system 12 with "enquire-session" requests, providing the public and private session identifier and secret, so that the access/session management system 12 can be sure the appropriate relying party 14 is enquiring a session that only the relying party 14, and only that particular relying party 14, was granted (operation 160). Once the authentication session is realized, the access/session management system 12 responds to the "enquire-session" request with an authentication assertion, including details of the realized user 16 (operation 170). Upon a successful authentication, a user 16 is able to progress on to relying party's interface, in which the relying party 14 grants the user 16 access protected resource that relying party is offering (operation 180).

It should be noted that, in some embodiments, the authentication session request/enquire/realization process of the system 10 described herein may further be enhanced via a realization verification step. In particular, upon a user's attempt to realize an authentication session, and the subsequent relying party's attempt to enquire the session realization, there is an intermediate request in which the user is prompted to provide a time-restricted OTP so as to essentially verify realization prior to the access/session management releasing session realization results to the relying party. This feature highlights an important facet of the access/session management system's role in the tripartite information exchange, specifically that of a context-aware arbiter in the authentication contract. By utilizing a realization verification step, an additional verification stage is added to help ensure there is no man-in-the-middle interception of any of the sensitive realization payloads. In particular, as will be described in greater detail herein, any intercepting or spying party cannot easily initiate the user interaction required in the realization verification step, as the interloper will not have access to the canonical secret stored securely on the bonded device during registration, the exchange of which is required as part of the realization verification process.

Figure 7:
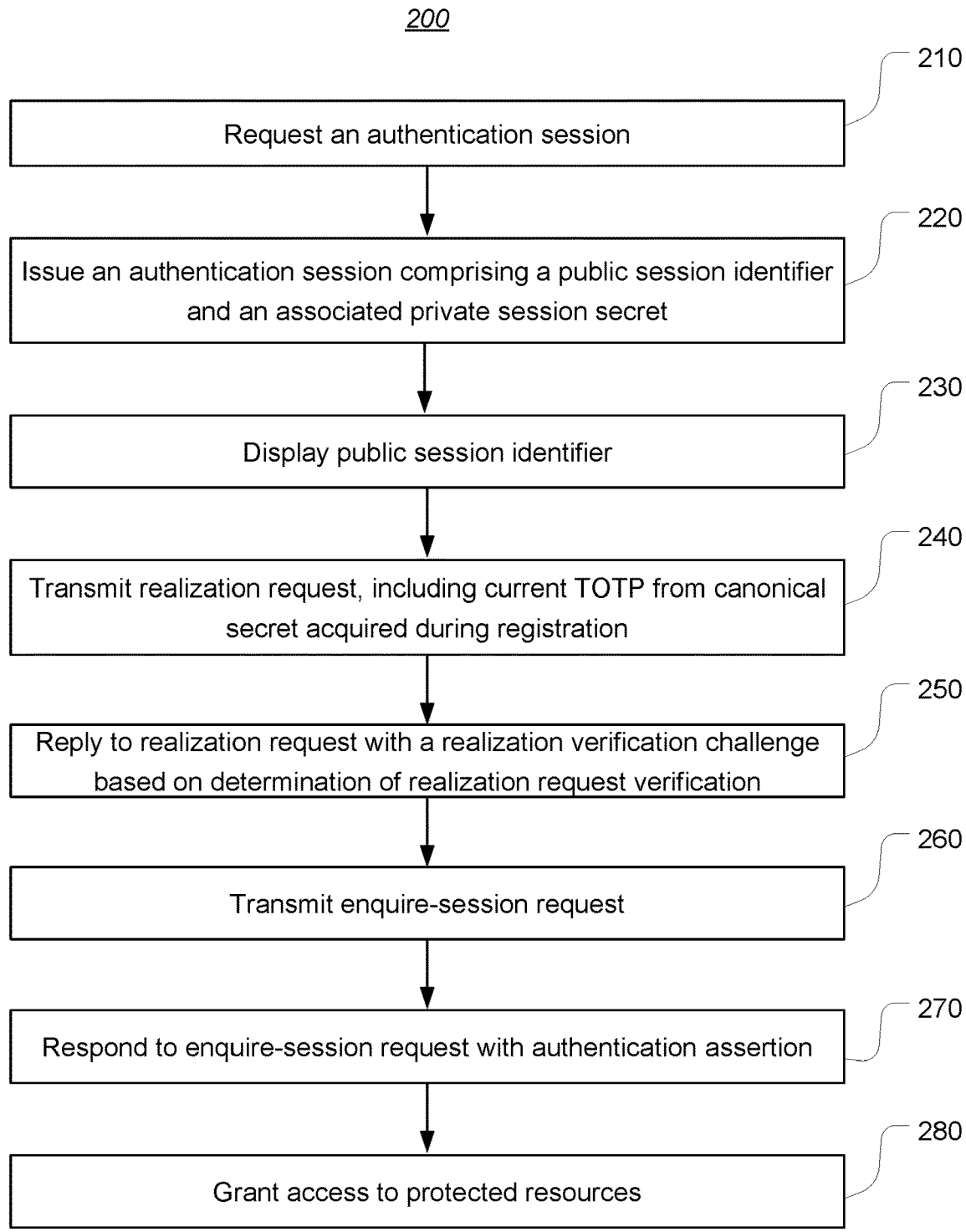
FIG. 7 is a flow diagram illustrating one embodiment of a method for authenticating a user via an authentication session request/enquire/realization process including an additional realization verification step.

FIG. 7 is a flow diagram illustrating one embodiment of a method 200 for authenticating a user via an authentication session request/enquire/realization process including an additional realization verification step. As can be seen, the session includes similar steps as the method 100 of FIG. 6. For example, the method 200 includes the relying party 14 requesting an authentication session from the access/session management system 12 (operation 210), and, in response to the authentication session request, the access/session management 12 issues a session consisting of a public session identifier and an associated private session secret (operation 220). The method 200 further includes displaying, via the relying party 14, a public session identifier (operation 230) which may include a QR code, a minimum three-word sequence (for voice identification), or other mechanism, that the user 16 is intended to either scan with, or dictate into, their registered smartphone 17(2). In turn, the user agent of the smartphone 17(2) detects the public session identifier via such event. The method 200 further includes transmitting, from the user agent of the registered smartphone 17(2), a realization request, including the current TOTP from the canonical secret acquired during registration (operation 240), thereby informing the access/session management system 12 that the session is being realized by a pre-registered user, and sends identifying secrets for that specific user 16.

At this point, the access/session management system 12 may make a determination as to whether or not to require realization verification (operation 250). The determination is generally governed by parameters that can be configured via an administrator of the system 12. For example, an administrator may configure the user's account to require realization verification always (i.e., for every authentication session), sometimes (as dictated by the occurrence of a specific event), or never. For example, realization verification may be triggered: the first instance of a user using a given relying party; after a given number of authentication attempts; each instance a token is refreshed (e.g., granted a new expiry date); each instance a new, permitted IP range is used for the first time (e.g., user is within a different geographical region in example of a multi-region corporate setting); and each instance a user's list of relying parties changes (e.g., when a new service is added or an existing service is removed).

Additionally, or alternatively, realization verification may be triggered based on relying party or user characteristics and/or behavior. In the relying party context, such characteristics and/or behavior may include: IP blacklist/whitelist compliance; IP range continuity check (e.g., if a relying party starts to use a new IP address or range, or the sequence of IP addresses does not conform to a typical behavior); geographical location continuity check in which the relying party might be expected to be hosted in a given location and/or must obey rules of continuity (e.g., a session request must be followed by session enquire from the same geography); behavioral aspects (e.g., a specific number of requests from a given relying party within a given time limit exceed a quota); and site reliability tests, such as uptime/latency, that might indicate a relying party is undergoing some form of throughput difficulties. In the user context, such characteristics and/or behavior may include: IP blacklist/whitelist compliance; IP range continuity including rapidly varying IP address or changes in behavior including time-based observations (e.g, a user using a particular IP at particular hours for no explainable reason); geographical restrictions or behavioral changes (e.g., user accessing from one region in the morning and a completely different region in the afternoon, or a non-continuity based variance); chronological restrictions (e.g., an administrator might mandate that realization is not allowed outside of normal office hours and, if authentication is attempted outside of normal office hours, the additional step of realization verification is required); and externally provided user behavioral concerns (e.g., a relying party might report an unusual pattern of activity using their restricted resources, triggering the need for realization verification on next access).

Additionally, or alternatively, realization verification may be triggered in the event that: the access/session management system comes under attack, either generally or for the given user (or given user's corporate account/employer); the corporate administrator might trigger continuity behavior (e.g., if their own corporate is under external DDoS (Distributed Denial of Service) or other related attack; and disaster recovery scenarios.

Accordingly, the access/session management system 12 will consider various parameters in order determine whether to trigger realization verification. For example, the access/session management system 12 may consider relying party configurations and expected behaviors and/or user configurations and expected behaviors and make a determine as to whether a realization verification is required. In the event that a determination is made that realization verification is required, the access/session management system 12 will reply to the verification request with a realization verification challenge (operation 250). The session realization store is updated with the identity of the user and the status is updated to reflect that the realization is challenged. The access/session management system 12 replies with the realization verification challenge, which may include, for example, an instruction to display the TOTP for a predetermined period of time (e.g., a number of seconds, such as 30 seconds), at which point, the user agent of the smartphone 17(2) may cause the smartphone 17(2) to display the current TOTP derived from the canonical secret on-screen for the period of time and, once the period of time has elapsed, the code may be removed from on-screen display. As will be described in greater detail herein with respect to FIGS. 8A and 8B, there are at least two variants in which either the user is required to complete realization verification via the relying party (e.g., if the realization verification trigger is relying party-oriented) or directly with the access/session management system 12 (e.g., if the realization verification trigger is user-oriented). The method 200 then continues on in which the relying party 14 continues to poll the access/session management system 12 with "enquire-session" requests (operation 260), and, once the authentication session is realized and verification is complete, the access/session management system 12 responds to the "enquire-session" request with an authentication assertion, including details of the realized user 16 (operation 270), and the user 16 is able to progress on to relying party's interface, in which the relying party 14 grants the user 16 access protected resource that relying party is offering (operation 280).

Figure 8A:
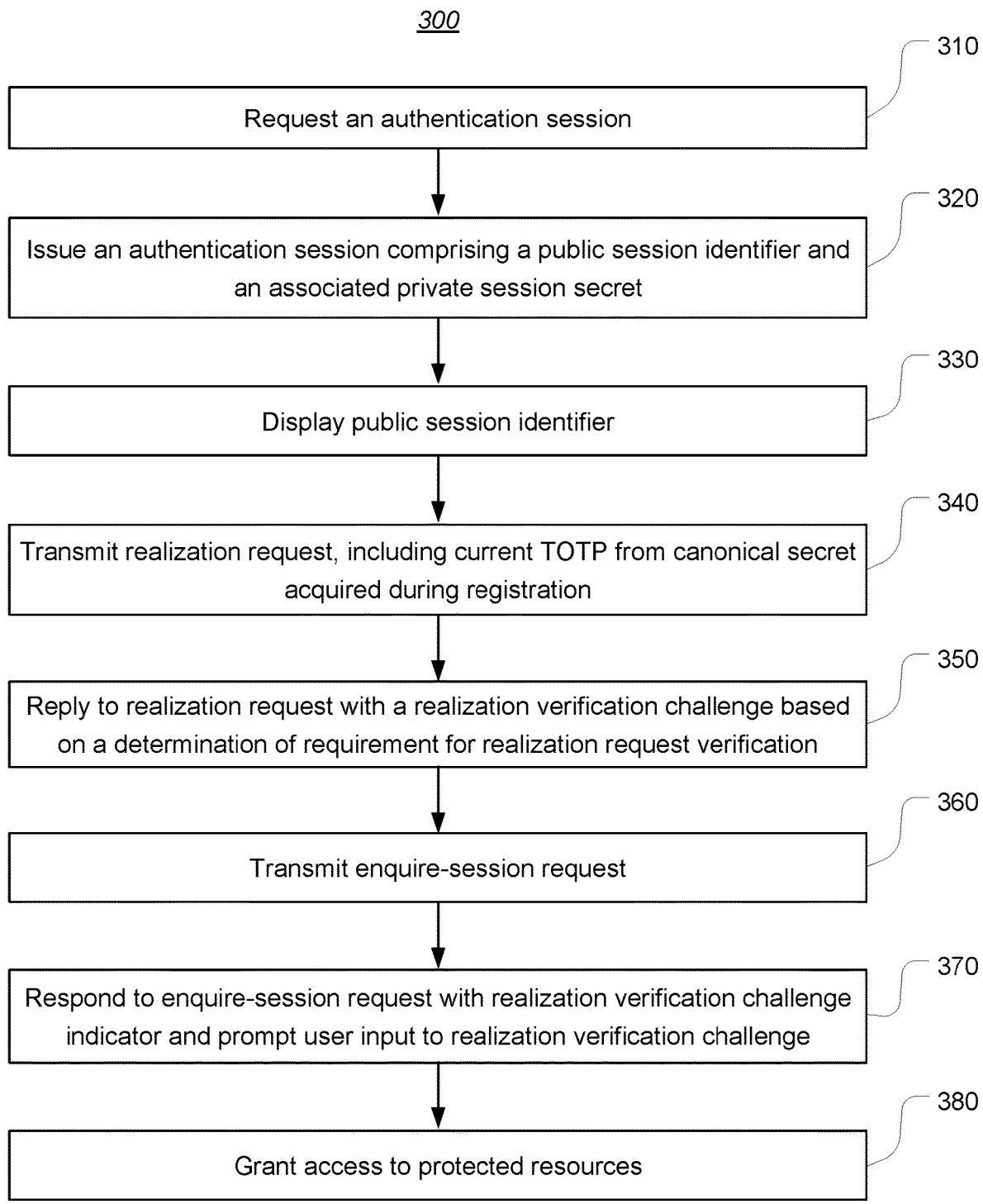
FIG. 8A is a flow diagram illustrating one embodiment of the authentication method of FIG. 7 including a realization verification step in which a user is required to complete realization verification via the relying party.

FIG. 8A is a flow diagram illustrating one embodiment of an authentication method 300 including a realization verification step in which a user is required to complete realization verification via the relying party. As can be seen, the session includes similar steps as the method 200 of FIG. 7. For example, the method 300 includes the relying party 14 requesting an authentication session from the access/session management system 12 (operation 310), and, in response to the authentication session request, the access/session management 12 issues a session consisting of a public session identifier and an associated private session secret (operation 320). The method 300 further includes displaying, via the relying party 14, a public session identifier (operation 330) which may include a QR code, a minimum three-word sequence (for voice identification), or other mechanism, that the user 16 is intended to either scan with, or dictate into, their registered smartphone 17(2). In turn, the user agent of the smartphone 17(2) detects the public session identifier via such event. The method 300 further includes transmitting, from the user agent of the registered smartphone 17(2), a realization request, including the current TOTP from the canonical secret acquired during registration (operation 340), thereby informing the access/session management system 12 that the session is being realized by a pre-registered user, and sends identifying secrets for that specific user 16.

The method 300 further includes the access/session management system 12 making a determination as to whether or not to require realization verification and, in the event that a determination is made that realization verification is required, the access/session management system 12 will reply to the verification request with a realization verification challenge (operation 350). The method 200 then continues on in which the relying party 14 continues to poll the access/session management system 12 with "enquire-session" requests (operation 360). The access/session management system 12 responds to the "enquire-session" request with a realization verification challenge indicator (i.e., indicating that the realization has been challenged) and, in turn, the relying party prompts the user to enter the TOTP displayed on-screen on the smartphone 17(2) (operation 370). In particular, the relying party may provide a form in which a user is able to enter the requested input data (i.e., the code) and, in turn, transmits the entered data to the access/session management system 12 for verification. If the data (i.e., entered code) is correct and provided within the predetermined period of time, the realization data is released in a session realized response from the access/session management system 12 in a session realized response, including the assertion of the realizing user's identity. Accordingly, the user 16 is able to progress on to relying party's interface, in which the relying party 14 grants the user 16 access protected resource that relying party is offering (operation 380).

Figure 8B:
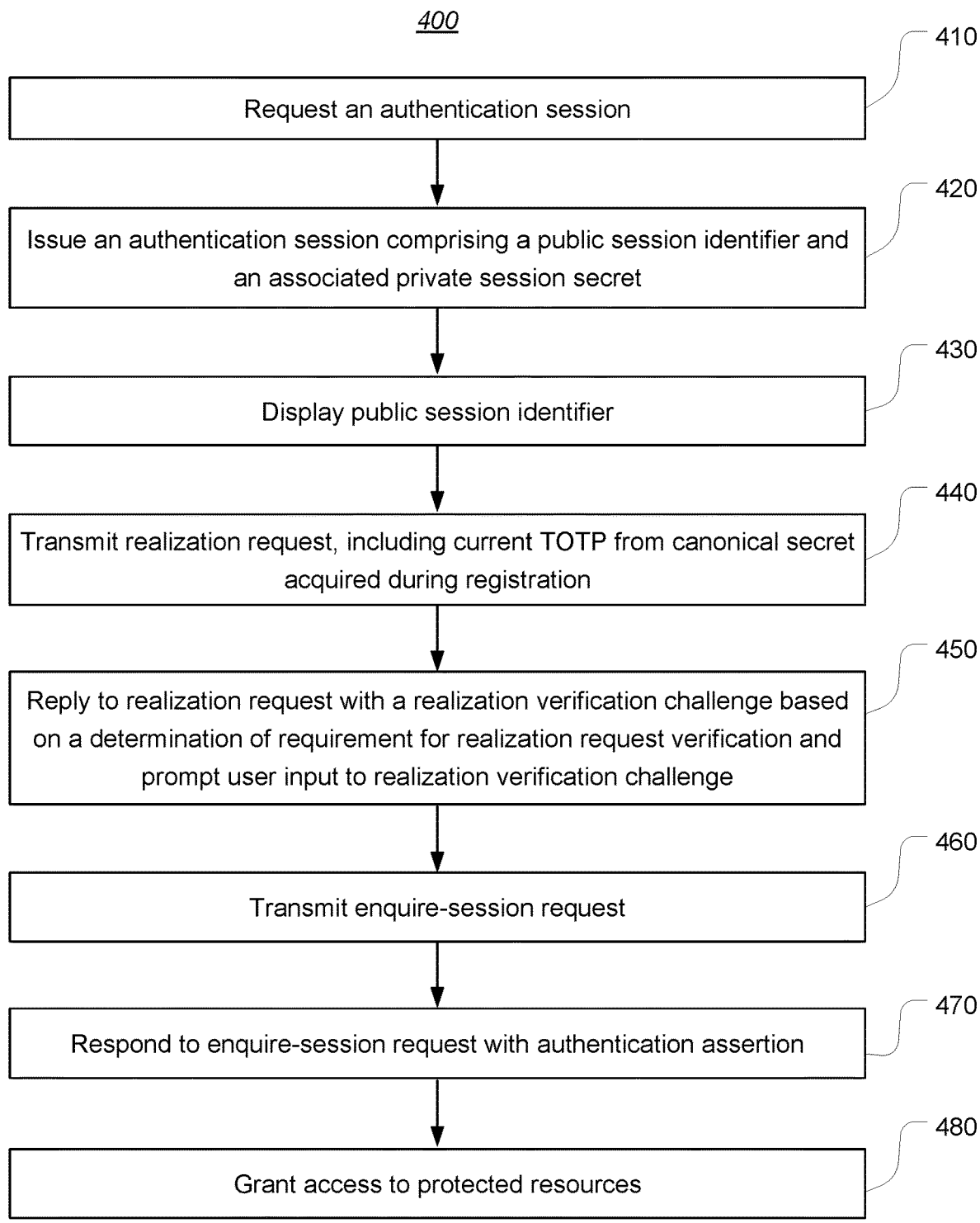
FIG. 8B is a flow diagram illustrating another embodiment of the authentication method of FIG. 7 including a realization verification step in which a user is required to complete realization verification via the access/session management system.

FIG. 8B is a flow diagram illustrating another embodiment of an authentication method 400 including a realization verification step in which a user is required to complete realization verification via the access/session management system. As can be seen, the session includes similar steps as the method 200 of FIG. 7. For example, the method 400 includes the relying party 14 requesting an authentication session from the access/session management system 12 (operation 410), and, in response to the authentication session request, the access/session management 12 issues a session consisting of a public session identifier and an associated private session secret (operation 420). The method 400 further includes displaying, via the relying party 14, a public session identifier (operation 430) which may include a QR code, a minimum three-word sequence (for voice identification), or other mechanism, that the user 16 is intended to either scan with, or dictate into, their registered smartphone 17(2). In turn, the user agent of the smartphone 17(2) detects the public session identifier via such event. The method 400 further includes transmitting, from the user agent of the registered smartphone 17(2), a realization request, including the current TOTP from the canonical secret acquired during registration (operation 440), thereby informing the access/session management system 12 that the session is being realized by a pre-registered user, and sends identifying secrets for that specific user 16.

The method 400 further includes the access/session management system 12 making a determination as to whether or not to require realization verification and, in the event that a determination is made that realization verification is required, the access/session management system 12 will reply to the verification request with a realization verification challenge (operation 450). In this instance, the user must complete realization verification directly with the access/session management system 12. Accordingly, the access/session management system 12 prompts the user to enter the TOTP displayed on-screen on the smartphone 17(2). In particular, the access/session management system 12 may display a code entry form for the user to provide the TOTP. In this instance, the user interface is assumed to no longer be associated with the relying party but rather the access/session management system. Upon correct entry of the code, the cached session status is upgraded to realized and the method 200 then continues on in which the relying party 14 continues to poll the access/session management system 12 with "enquire-session" requests (operation 460), and, once the authentication session is realized and verification is complete, the access/session management system 12 responds to the "enquire-session" request with an authentication assertion, including details of the realized user 16 (operation 470), and the user 16 is able to progress on to relying party's interface, in which the relying party 14 grants the user 16 access protected resource that relying party is offering (operation 480).

Accordingly, by utilizing a realization verification step, an additional verification stage is added to help ensure there is no man-in-the-middle interception of any of the sensitive realization payloads. In particular, any intercepting or spying party cannot easily initiate the user interaction required in the realization verification step, as the interloper will not have access to the canonical secret stored securely on the bonded device during registration, the exchange of which is required as part of the realization verification process. Additionally, the further verification stage (i.e., realization verification) can be carried out without breaking two key tenets of the present invention: the bonded device is not required to communicate directly with the relying party; and the user is not required to enter any credential, as the short-lived one-time passcode is derived from a secret, but does not form a self-standing credential on its own.

Figure 9:
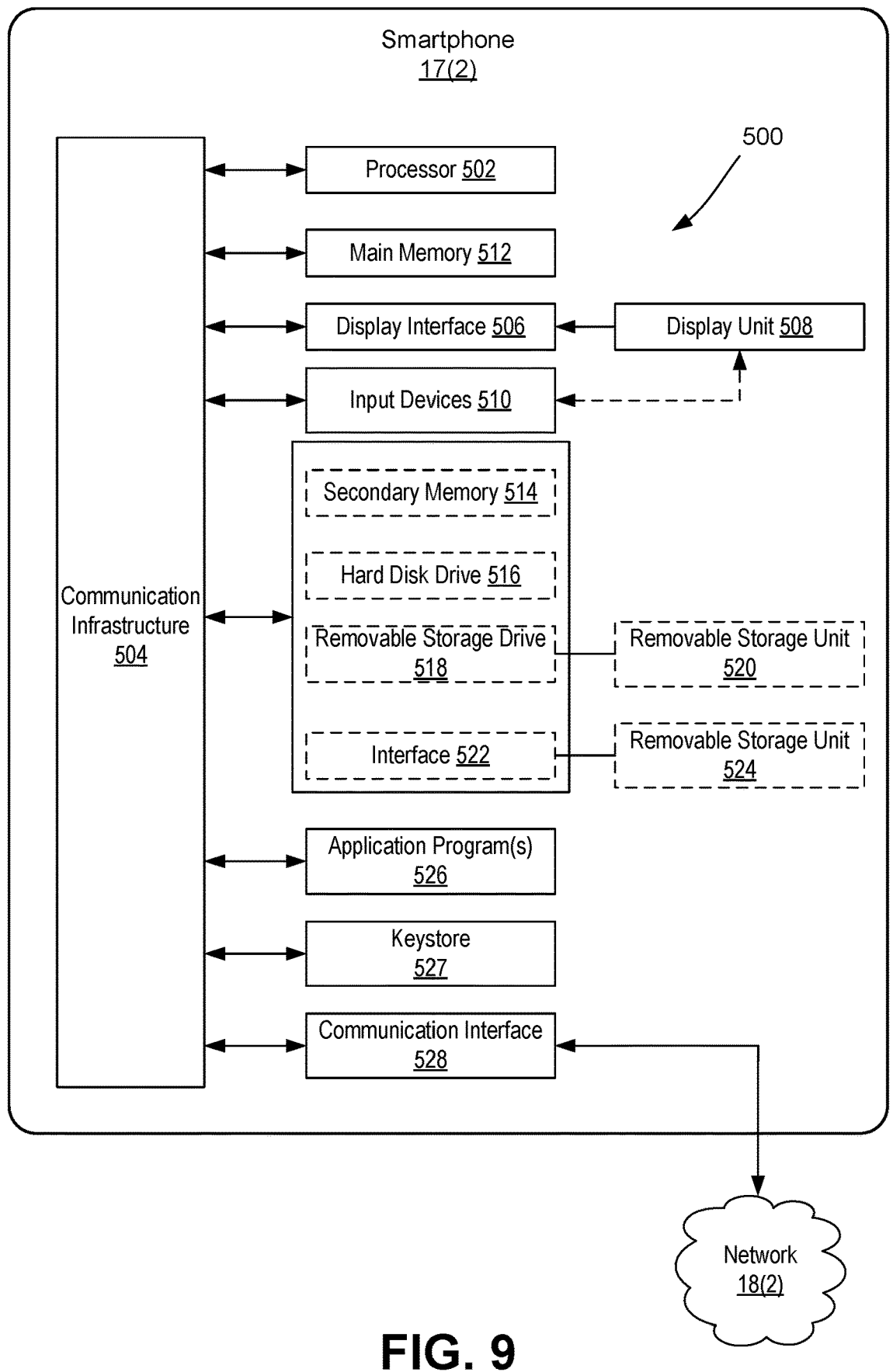
FIG. 9 is a block diagram illustrating at least one embodiment of a personal computing device to be used as the trusted/bonded device for authentication sessions.

FIG. 9 is a block diagram illustrating at least one embodiment of a personal computing device 17(2) (hereinafter "smartphone 17(2)") for communicating with the access/session management system 12 of the present disclosure. The smartphone 17(2) generally includes a computing system 500. As shown, the computing system 500 includes one or more processors, such as processor 502. Processor 502 is operably connected to communication infrastructure 504 (e.g., a communications bus, cross-over bar, or network). The processor 502 may be embodied as any type of processor capable of performing the functions described herein. For example, the processor may be embodied as a single or multi-core processor(s), digital signal processor, microcontroller, or other processor or processing/controlling circuit.

The computing system 500 further includes a display interface 506 that forwards graphics, text, sounds, and other data from communication infrastructure 504 (or from a frame buffer not shown) for display on display unit 508. The computing system further includes input devices 510. The input devices 510 may include one or more devices for interacting with the user smartphone 17(2), such as a keypad, mouse, trackball, microphone, camera, as well as other input components, including motion sensors, and the like. In one embodiment, the display unit 208 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the user smartphone 17(2), such as accessing and interacting with applications executed on the smartphone 17(2), including an app associated with the access/session management system 12 and the registration and authentication services provided. For example, the app may include an access management software application may include user agent(s) to be used for completing the registration process and used in future authentication sessions (i.e., future sessions or events in which the user is authenticated and granted access to the protected resource(s)).

The term "user agent" may generally refer to a service that runs in direct response to, and communication with, a user. In the context of the access/session management system 12, for example, the user agent may be a system that supports the user-centric features of the collaborating system, such as registration and then secure storage of any identity-related properties, tokens, or identifiers that are mandated by the access/session management system 12, thereby ensuring that storage of such data is secure.

For example, as used herein, the term "authenticator" is an example of a user agent that performs a more specific role, namely of exchanging necessary user data directly with the access/session management system 12 for the purposes of authenticating the user so as to gain access to protected resource(s) provided by the relying party 14. In other words, the authenticator is a user agent that may directly establish an authentication session with the access/session management system 12 by direct communication. Additionally, or alternatively, the code generator module is a user agent that participates in the registration session and certain configuration exchange with the access/session management system 12 but does not directly establish an authentication session with the access/session management system 12.

The computing system 500 further includes main memory 512, such as random access memory (RAM), and may also include secondary memory 514. The main memory 512 and secondary memory 514 may be embodied as any type of device or devices configured for short-term or long-term storage of data such as, for example, memory devices and circuits, memory cards, hard disk drives, solid-state drives, or other data storage devices. Similarly, the memory 512, 514 may be embodied as any type of volatile or non-volatile memory or data storage capable of performing the functions described herein.

In the illustrative embodiment, the user smartphone 17(2) may maintain one or more application programs, databases, media and/or other information in the main and/or secondary memory 512, 514. The secondary memory 514 may include, for example, a hard disk drive 516 and/or removable storage drive 518, representing a floppy disk drive, a magnetic tape drive, an optical disk drive, etc. Removable storage drive 518 reads from and/or writes to removable storage unit 520 in any known manner. The removable storage unit 520 may represents a floppy disk, magnetic tape, optical disk, etc. which is read by and written to by removable storage drive 518. As will be appreciated, removable storage unit 520 includes a computer usable storage medium having stored therein computer software and/or data.

In alternative embodiments, the secondary memory 514 may include other similar devices for allowing computer programs or other instructions to be loaded into the computing system 500. Such devices may include, for example, a removable storage unit 524 and interface 522. Examples of such may include a program cartridge and cartridge interface (such as that found in video game devices), a removable memory chip (such as an erasable programmable read only memory (EPROM), or programmable read only memory (PROM)) and associated socket, and other removable storage units 524 and interfaces 522, which allow software and data to be transferred from removable storage unit 524 to the computing system 500.

The computing system 500 further includes one or more application programs 526 directly stored thereon. The application program(s) 526 may include any number of different software application programs, each configured to execute a specific task, including the access/session management system software used for registration and authentication purposes.

In some embodiments, the computing system 500 may further include a hardware-backed keystore 527, or similar repository, in which certain private keys, certificates, and symmetric keys can be stored. As previously described, an additional aspect of the registration process is a key exchange (certificate exchange) between the access/session management system 12 and the smartphone 17(2) to thereby improve the security of registration. In particular, the system 10 may utilize public-key cryptography, or asymmetric cryptography, in which the smartphone 17(2) can generate a pair of keys: a public key and a private key, and send the public key to the access/session management system 12 while storing the private key on the hardware-backed keystore 527 on the smartphone 17(2). The system 10 can then rely on attestation for assertion that the public key is provided from a valid, secure hardware-backed keystore. The key exchange initiated by the user agent provides an additional security measure for the registration and authentication processes in that, there is a chance that a rogue malware agent on the smartphone 17(2) might access the canonical secret if the user agent software is not well written. That slight chance of security breach is effectively reduced to none by sending a public key from the smartphone 17(2) with a hardware-backed keystore (so the private key can never leave the smartphone 17(2) or even be accessed by app memory).

The computing system 500 further includes a communications interface 528. The communications interface 528 may be embodied as any communication circuit, device, or collection thereof, capable of enabling communications between the user smartphone 17(2) and external devices. The communications interface 528 may be configured to use any one or more communication technology and associated protocols, as described above, to effect such communication. For example, the communications interface 528 may be configured to communicate and exchange data with the access/session management system 12 and relying party 14, as well as other computing devices, via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards, and a combination thereof. Examples of communications interface 528 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 512 and/or secondary memory 514 or a local database on the user smartphone 17(2). Computer programs may also be received via communications interface 528. Such computer programs, when executed, enable the computing system 500 to perform the features of the present invention, as discussed herein. In particular, the computer programs, including application programs 526, when executed, enable processor 502 to perform the features of the present invention. Accordingly, such computer programs represent controllers of computer system 500.

In one embodiment where the invention is implemented using software, the software may be stored in a computer program product and loaded into the computing system 500 using removable storage drive 518, hard drive 516 or communications interface 528. The control logic (software), when executed by processor 502, causes processor 502 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

As previously described herein, in some embodiments, voice and/or speech recognition may be used for authentication purposes. Voice recognition, also commonly referred to a voiceprint, is the identification and authentication arm of the vocal modalities. By measuring the sounds a user makes while speaking, voice recognition software can measure the unique biological factors that, combined, produce the user's voice. Voiceprints can be measured passively as a user speaks naturally in conversation, or actively, if the user is made to speak a passphrase. The key is that true voice recognition measures the minutia of the voice, and is not wholly dependent on a spoken code or passphrase (though spoken passphrases can be used to speed up the process, they are not necessary). Speech recognition, on the other hand, is a technology that aims to discern the actual words being spoken in a voice sample and makes no claims against the identity of the user providing the sample or any other characteristic of their voice. When combined, speech and voice recognition can be a powerful duo, able to provide a strong means of authenticating a user.

The following examples of spoken phrase authentication techniques (described with respect to FIGS. 10-14), are based on a combination of features of speaker recognition, speech recognition and/or TOTP sequence. The end result is a natural and easy-to-use authentication that supports the requirements of multi-factor authentication (MFA) and further strengthens the authentication services provided by an access/session management system 12 consistent with the present disclosure.

Figure 13:
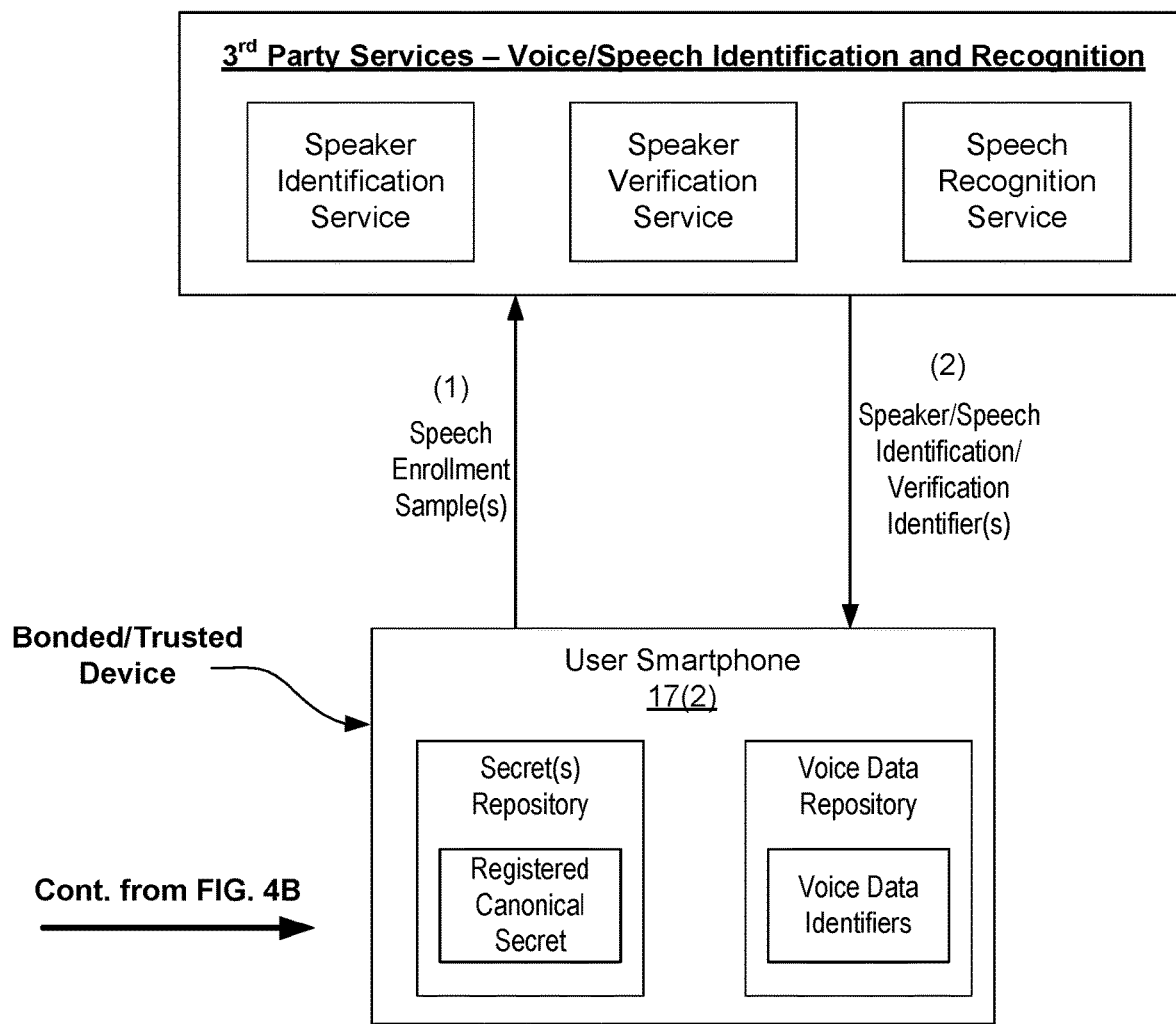
FIG. 13 is a block diagram illustrating an exemplary registration session in which a user's smartphone that has already undergone an initial registration procedure of FIGS. 4A and 4B further registers additional authentication factors, namely speech and voice identification and recognition factors.
Figure 14:
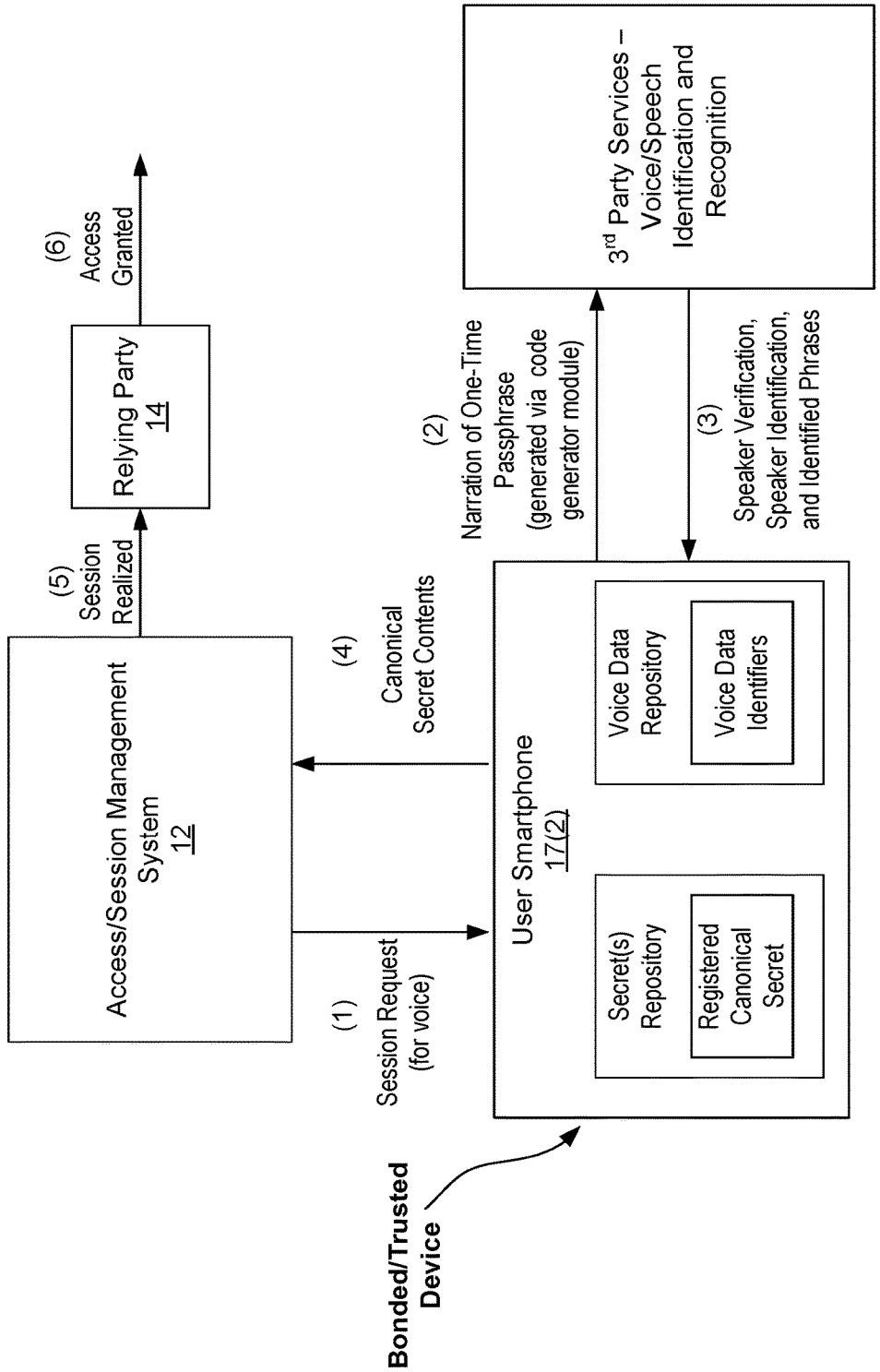
FIG. 14 is a block diagram illustrating an exemplary authentication session including use of a spoken passphrase as an additional authentication factor used in the authentication process.

FIGS. 10, 11A-11B, and 12A-12B illustrate a system providing a spoken authentication service including an access/session management system-driven, voice profile matching and phrase verification authentication model. FIGS. 13 and 14 illustrate a system providing a spoken authentication service including a user agent-driven voice profile and phrase verification authentication model using a mediated, access/session management system-derived session exchange.

With reference to FIGS. 10, 11A-11B, and 12A-12B, this system embodiment concerns the use of speaker recognition and speech recognition with a TOTP composed from a user-tailorable dictionary of finite discrete words, which is herein referred to as a Time-Oriented Word Sequence (TOWS).

Figure 10:
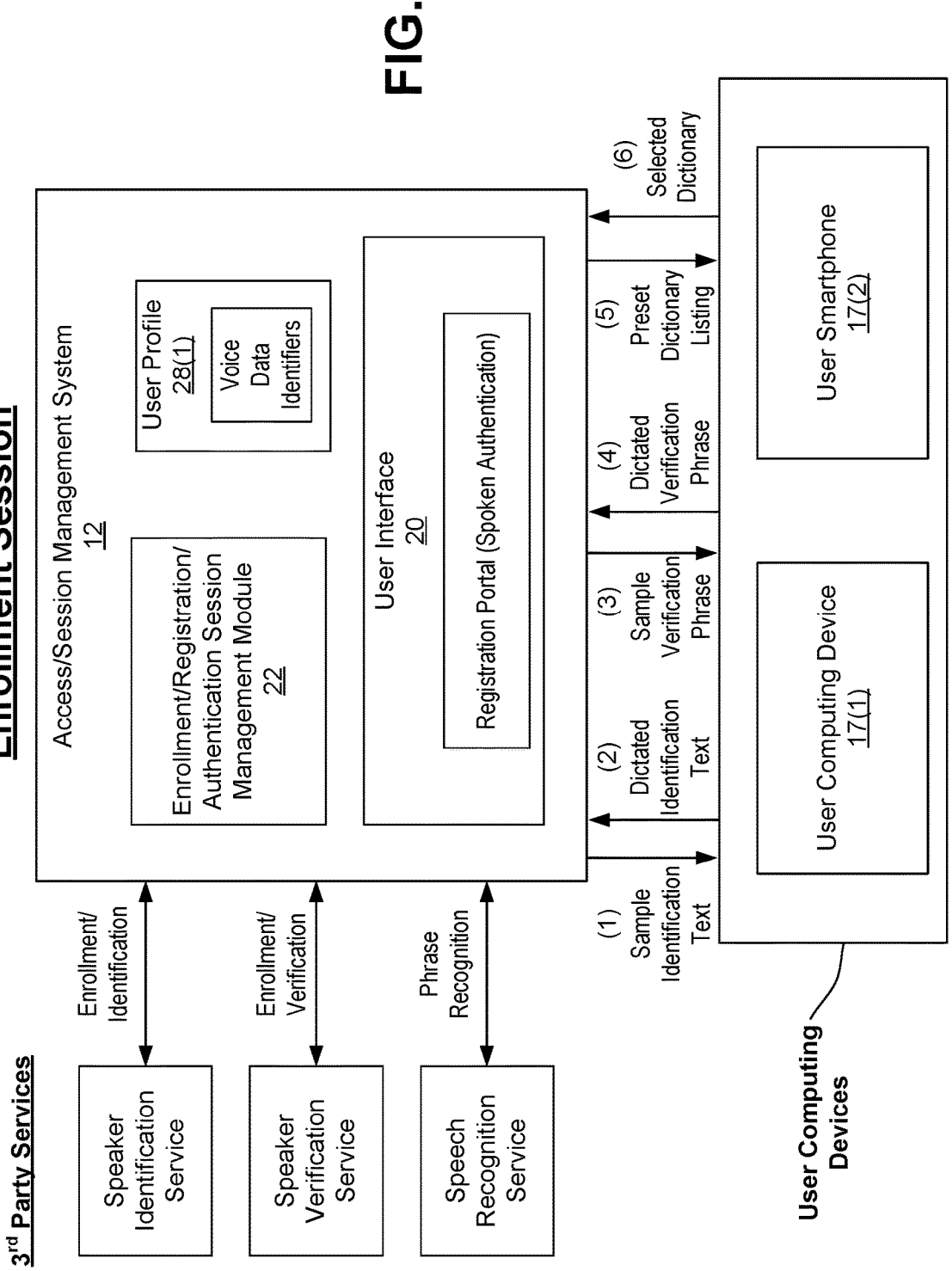
FIG. 10 is a block diagram illustrating an exemplary registration session between a user computing device, a user smartphone, and the access/session management system for registering a user with a spoken authentication service provided by the access/session management system.

FIG. 10 is a block diagram illustrating an exemplary registration session between a user computing device 17(1), a user smartphone 17(2), and the access/session management system 12 for registering a user with a spoken authentication service provided by the access/session management system 12. It should be noted that registration is required to submit voice samples with a speech recognition service and speaker recognition/identification service (3rd party services), and to configure and pre-seed a code generator. The initial registration process is driven by the access/session management system. It is also possible to consider registration as a distinct prior setup step (prior to attempting access to the relying party), as there is voice training and dictionary configuration to complete.

The process begins when a user navigates to a registration page for the spoken authentication service with an access/session management system, which may be aware of the user's unique authentication identifier or username (typically an email address). It should be noted that this step may have a prior credential with that same identifier in some other authentication system. In other words, a user may have already registered with the access/session management system (in a similar fashion as described with respect to FIGS. 4A and 4B). In such a scenario, the user is effectively registering for spoken authentication services. As such, the access/session management system may consider the user's capability to complete authentication with the prior system as a valid proof of identity for registration with the spoken authentication service.

The user is first guided, via the registration portal (spoken authentication) of the user interface 20, through a speaker recognition registration phase involving speaker recognition/identification (i.e., identifying a particular individual based on their speech). This step involves the user narrating text for a period of time (e.g., approximately 30 seconds) to provide a rich sample for the speaker identification service. For example, a user may be shown sample identification text and, by speaking into the microphone of their smartphone 17(2) can transmit dictated identification text to the access/session management system to be passed on to the speaker identification service. Although the speaker identification service may support any free text, the access/session management system may suggest, or even force, a chosen narrative that explores phonetically desirable traits. For example, the access/session management system may provide a sample piece of poetry or dramatic prose, to enforce pronounced enunciation of key phonetic structures. A voice data identifier is created and stored in the user profile.

In some embodiments, an additional step of speaker recognition may include speaker verification. This step involves a precise phrase chosen from a small selection of available phrases with a speaker verification service and narrated until an acceptable sample of that exact phrase is achieved. It should be noted that, unlike speaker recognition/ identification, that can match any free text with the user's profile, this speaker verification sample is intended to be repeated verbatim by the end-user. This optional additional step may be used to confirm a user's possible identity match when the speaker identification score does not reach a certain level of full confidence (i.e., falls below a threshold level of acceptable confidence during an authentication session). Furthermore, in some embodiments, the user may be provided with a dictionary selection page, which may involve the user selecting from a preset list of dictionaries, or even allowing the user to provide a dictionary of their own choosing. The dictionary should be of a minimum of 100 words, each of two syllables minimum. It is not necessary for the user to narrate the dictionary, just to provide the list of words that will be used for future authentication. In the event that this additional step is not included as part of the speaker recognition, then a standard shared dictionary will be used. This might be of considerably larger than 100 words. The capability to assign a user-tailored dictionary is considered a major advantage of this approach. In. this way different spoken languages might even be supported, as long as the speaker identification service supports those vocabularies.

The User must now register a compatible code generator and will be prompted to download/install one on a single code generator device (i.e., the smartphone 17(2)), wherein this device will be used for all future passphrase generation.

Figure 11A:
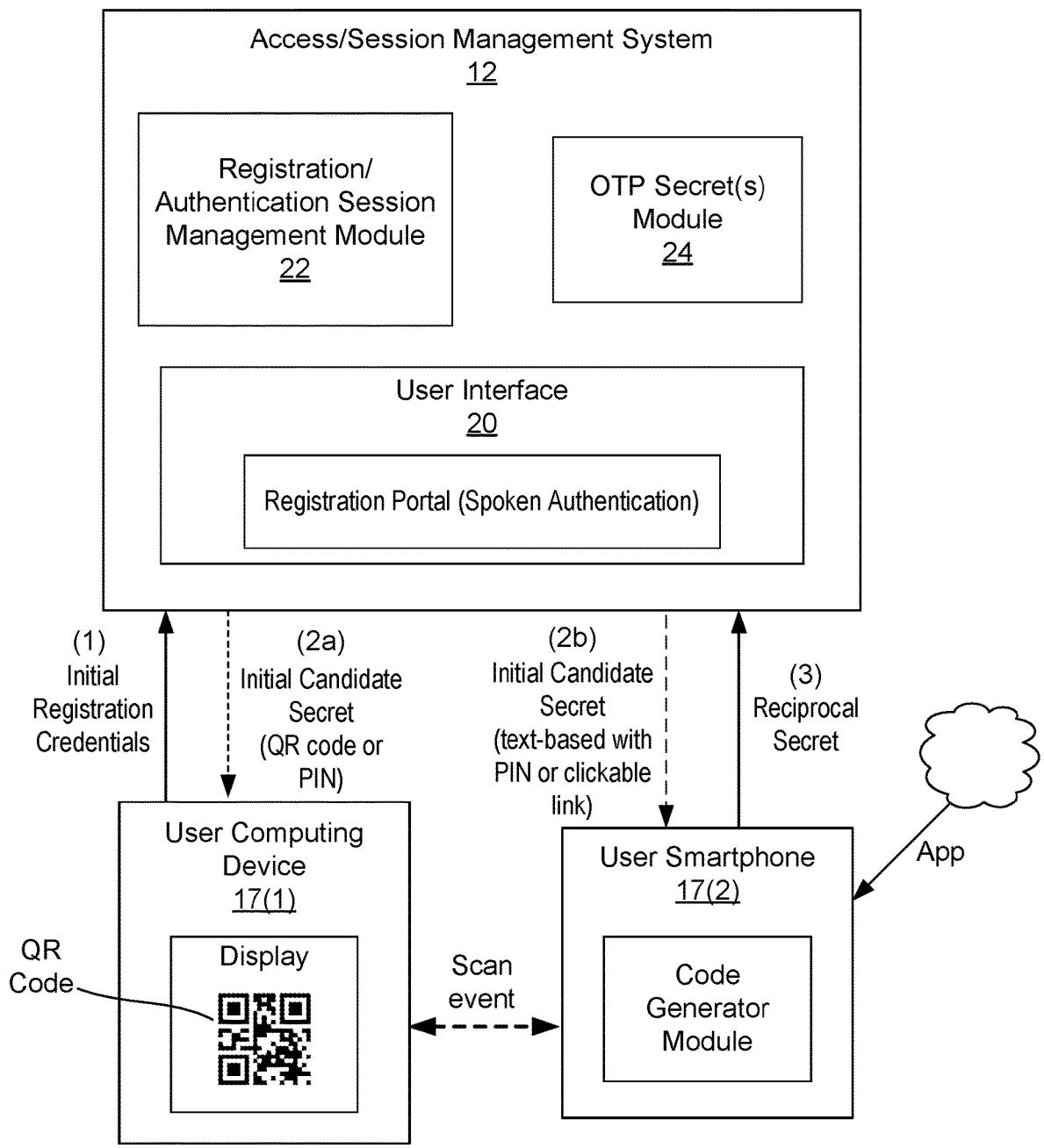
FIGS. 11A and 11B are block diagrams illustrating an exemplary registration session between a user computing device, a user smartphone, and the access/session management system for registering a user with access/session management system services, including the spoken authentication service, which is required in order to undergo future authentication sessions so as to access a relying party's protected resources.
Figure 11B:
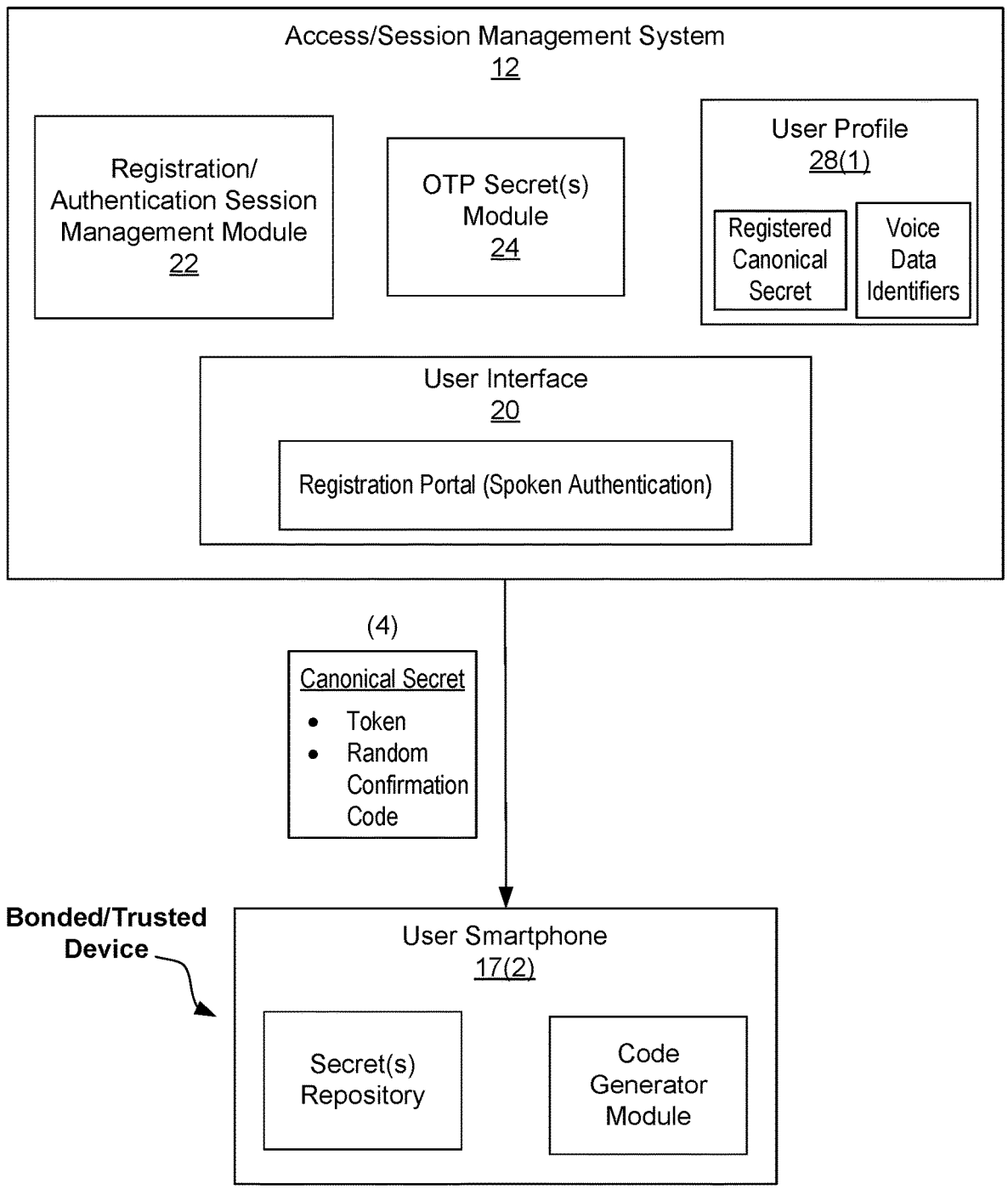

FIGS. 11A and 11B are block diagrams illustrating an exemplary registration session between a user computing device, a user smartphone, and the access/session management system for registering a user with access/session management system services, including the spoken authentication service, which is required in order to undergo future authentication sessions so as to access a relying party's protected resources. This process of registration proceeds in a similar fashion as described with respect to, and shown in, FIGS. 4A and 4B. For example, an introduction secret is generated, in a Reciprocal TOTP (RTOTP) scheme, which is intended to be relayed to the code Generator, either by displaying a scannable QR code or some other means (such as emailing or direct messaging a suitable link to the chosen device and then opened with the code generator application running natively on the device). In accordance with RTOTP, a candidate secret is generated and sent to the reciprocation URL contained in the RTOTP otpauth URL. The reciprocation response from the smartphone 17(2) is as described by RTOTP but with some additional features, noted immediately below.

It should be noted that this example does not require a template session-realization URL, since there will be no transmission to the access/session management system from this device (it is not an authenticator but a code generator). Similarly, the public key for signing is not necessary, since no further communication will take place. Rather, the user's full dictionary (or a URL to retrieve it) is sent, in which the words will be used to generate pass phrases in future.

An ordered list of check-image URLs will be sent, the purpose of which is to attach an easy-to-recognize visual representation of an entire phrase based on a suitable algorithm. The purpose of the check-image URL is to provide a visual representation of each unique phrase (combination of words), which will assist a user in selecting a phrase from a list of phonetically similar phrases that might differ by only one character, or plural. As such, a user simply has to match the check image.

The ordered list of check-image URLs may generally consist of an ordered list of images with an easy-to-use reference to lookup the image data. This list may be fixed at the point of registration. The system may rely on a relatively simple algorithm for producing a repeatable numeric representation of any given phrase in the range 0 to (number of images −1). Consequently, a consistent image can be shown in the candidate phrase list at the smartphone, one of which will match the single session identifier passphrase shown on the screen for the authentication portal during an authentication session. In some rare cases, an accidental collision will occur and the same image might appear for more than one candidate phrase. This can be alleviated with a larger quantity of images, and careful selection of an algorithm. An exemplary algorithm includes a Java hashcode algorithm for Strings applied to a concatenation of the phrase words with a given separator into one string, then subject to modulo arithmetic by the number of images available.

Upon completion of the registration session, the canonical secret is stored, which is key to future passphrase generation. As the canonical secret has been exchanged peer-to-peer, it is considered more secure than standard TOTP and ensures a bonded-device metaphor (i.e., the secret cannot co-exist on any other device, since reciprocation is allowed only once). At this point, the user may use the code generator to generate a one-time passphrase and narrate the OTP into the registration portal as a verification step. If verification is completed, the canonical secret is locked in and the user's identity is registered. It should be noted that, if the registration was initiated from within an authentication context (i.e., the user had launched the relying party and attempted to authenticate without previously having completed registration) then the successful registration also qualifies as successful authentication, since the verification phrase completes a second factor.

Accordingly, registration involves the user registering for the service and providing samples used for speaker identification, speaker verification and speech recognition, and, in some embodiments, may involve the construction of a user-specific dictionary of a minimum of 100 words, for example. Registration further involves the formation of a seed secret for each discrete user according to the TOTP algorithm (the standard RFC 6238) or a similar algorithm, such as RFC 4226, or preferably in a manner similar to the reciprocal TOTP process described with respect to, and shown in, FIGS. 4A and 4B, to ensure a peer-to-peer secure exchange. The secret is registered on a separate system that behaves as a code generator but, unlike standard TOTP code generators, the code generator expresses the current OTP for a given interval (typically 30 seconds) as a passphrase composed of a minimum of 3 words from the user's Dictionary. The full list of words in the user's Dictionary is also exchanged with the seed secret during registration.

Figure 12A:
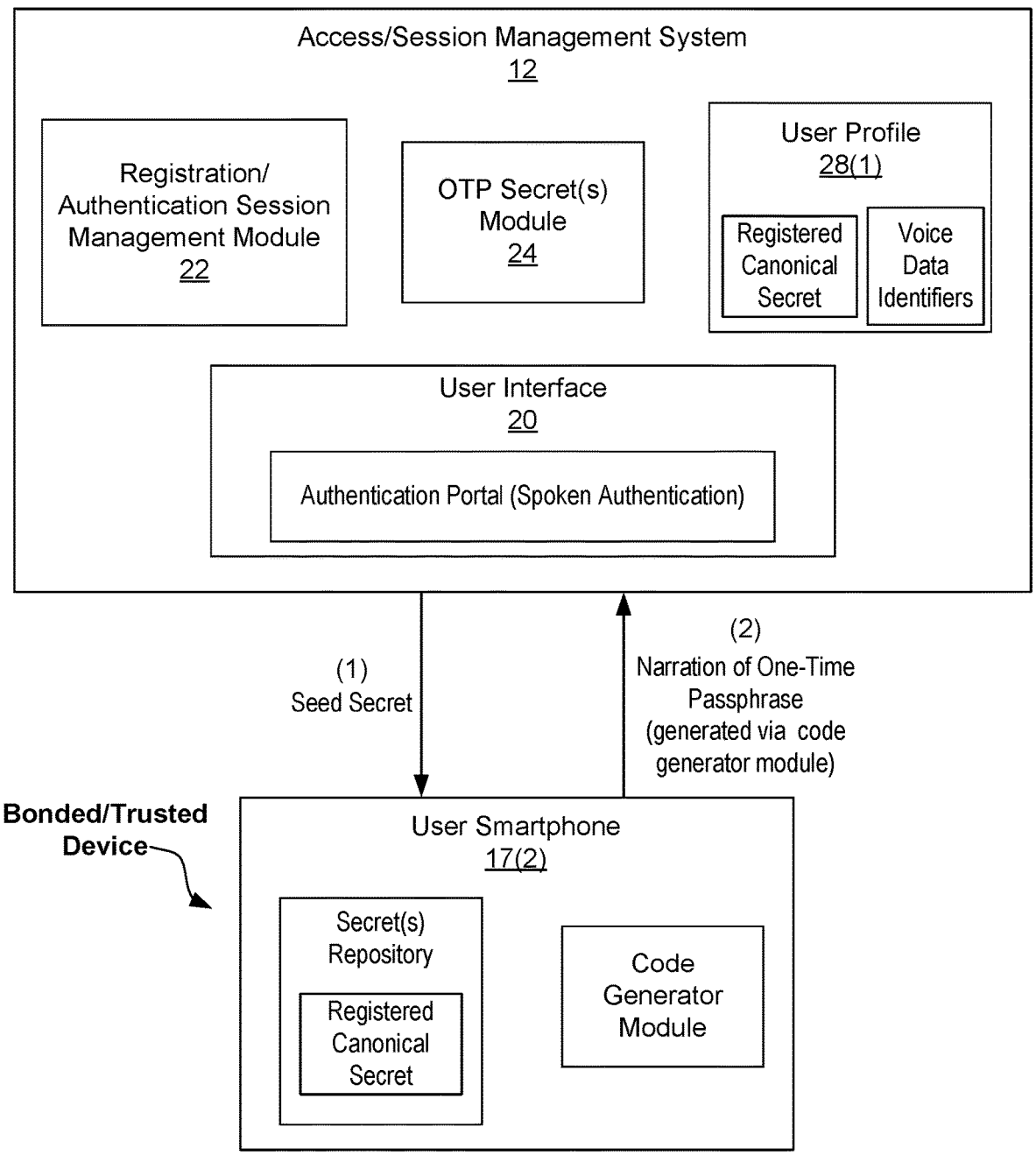
FIGS. 12A and 12B are block diagrams illustrating an exemplary authentication session based on the spoken authentication service provided by the access/session management system, including voice profile matching and phrase verification authentication of a user attempting to access a relying party's protected resources.
Figure 12B:
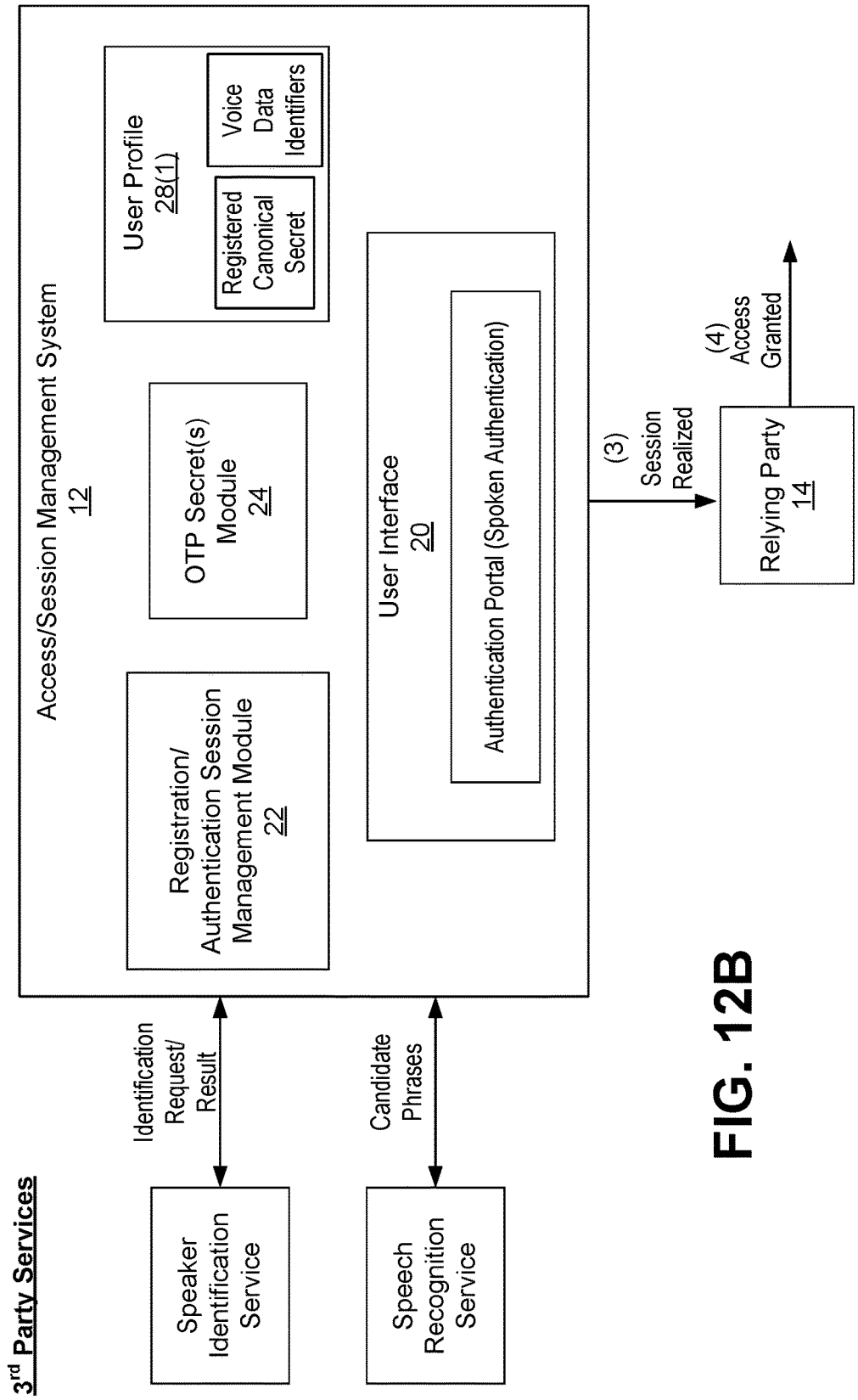

FIGS. 12A and 12B are block diagrams illustrating an exemplary authentication session based on the spoken authentication service provided by the access/session management system, including voice profile matching and phrase verification authentication of a user attempting to access a relying party's protected resources.

Authentication involves simply dictating the current (e.g., a minimum 3 words) pass phrase into the authentication portal (that may be part of the authenticating application itself). In turn, speech recognition is applied to the sample and solicits a user choice if there are multiple similar phrases and may also involve the display of a check image to help with user identification. The access/session management system performs a speaker recognition/identification match on the sample, to find a list of possibly matching users. Furthermore, the access/session management system may resort to a speaker verification sample if there is a small list of possible matching users. The appropriate seed secret is retrieved and a TOTP verification is performed to find the single user that matches.

For example, authentication may generally involve the user accessing the authentication portal provided via the user interface of the access/session management system, in order to interact directly with the access/session management system, typically within the context of a relying party requiring authentication. It should be noted that, in this scenario, the access/session management system is not necessarily a separate entity to the relying party. That is, this model of authentication is a novel adaptation of the existing direct-to-client-device model, rather than the three one-way relay model previously described herein.

The authentication session may begin upon a user attempting to login with a relying party, which, in turn, redirects the user to an authentication portal of either a separate authentication authority (i.e., access/session management system) or, alternatively, an authentication page of the relying party (in which case it can be referred to as a "service provider"). The user invokes their pre-registered code generator that shows a time-oriented three word (or four word) phrase, from the TOTP code using the algorithm at [RFC 6238] or a similar algorithm. It should be noted that the passphrase could be any number of words. The passphrase is calculated using a standard truncation as shown in that algorithm, to produce a 6-digit or 8-digit code. Using a 100-word dictionary a three or four word phrase is then mapped by taking pairs of digits to calculate a number from 0 to 99 and indexing into the ordered dictionary of words. Effectively, this model involves calculating 3 (or 4)×base−100 words that then index into the dictionary. In some embodiments, the truncation feature of the algorithm at [RFC 6238] might be adapted to produce any base ordinal number corresponding to the size of the dictionary. It is suggested a minimum size of dictionary is 100, but a larger dictionary is encouraged as more secure, within the boundaries of patience of the registering user, of course. In some embodiments, a check image may be shown from the list exchanged during registration, and calculated from an algorithm dependent on the exact characters of the passphrase.

The use of a dictionary involves mapping various numeric schemes to phrases. The key underlying concept is to treat the dictionary as an ordered set of discrete entries in a number base system. Much as 0, 1, 2, 3, 4 . . . C, D, E, F etc. represent ordered entries in a hexadecimal numbering system, so an ordered dictionary of words can represent numbers, a selection of which is illustrated in Table 1 below:

TABLE 1

Exemplary Dictionary of Words/Numbers

| Ordinal | Word |
| --- | --- |
| 0 | Forgetful |
| . | . |
| . | . |
| . | . |
| 21 | Carpenter |
| . | . |
| . | . |
| 28 | Vanishing |
| . | . |
| . | . |
| . | . |

TABLE 1-continued

Exemplary Dictionary of Words/Numbers

| Ordinal | Word |
| --- | --- |
| 37 | Gravity |
| . | . |
| . | . |
| . | . |
| 62 | Telephone |
| . | . |
| . | . |
| . | . |
| 79 | Department |
| . | . |
| . | . |
| . | . |
| 99 | Multiply |

With this scheme, it is possible to represent an 8-digit OTP using four words or phrases. For example, the OTP "62213779" can be shown as four 2-digit numbers "62-21-37-79" and converted to the Dictionary words, by index of: "Telephone-Carpenter-Gravity-Department". It should further be noted that a given dictionary might be tailored for a given user, or even selected from a prepared set of stock dictionaries organized by language and/or topic. As the code generator is TOTP-based, it is sufficient to mandate a 100-word minimum dictionary. A higher number of entries may result in fewer required words in the passphrase. For example, if 1,000 words are provided in the dictionary then a 6-digit TOTP can be represented by just two words.

Upon being shown the passphrase, the user now narrates the passphrase directly into the narration capable authentication portal/page via their smartphone. The capability to access a microphone to obtain a voice sample is supported, for example, in web applications by the HTML5 Web Speech API. The sample is now analyzed for speaker recognition/identification and speech recognition in order to determine an appropriate matching voice profile and the precise spoken words.

It should be noted that there are options for the order in which this processing is carried out, based on a number of factors (i.e., accuracy of speaker identification, number of samples that can be considered, etc.). For example, a key requirement of spoken authentication is the capability to match a registered speaker with a given sample of free text. As described herein, speaker recognition services fall into two categories: speaker verification and speaker identification. Speaker verification requires a given text and so might not be suitable for free text matching. It is also known that some speaker identification services have an upper limit of the number of candidate profiles that can be considered for match, which might prove to be a limitation for the spoken time-oriented passphrase method, since the concept requires no prior username and relies on a direct match of the sample against a potentially large set of registered samples. Accordingly, for this reason, it might be appropriate to adopt a different order of verification that matches by the derived OTP in numeric form first.

For example, for each user, there is a single canonical secret (via RTOTP), used as a seed for keyed-hash message authentication code (HMAC) generation (also referred to as hash-based message authentication code) with a time skew for each 30-second bucket (see RFC 6238). Periodically, a service may run to calculate the expected TOTP passcodes for every user for each 30-second bucket over the next n minutes, depending on capacity. Each TOTP passcode can then be converted to the appropriate passphrase for that User and stored for lookup. ["select userid from current_passphrases where bucket=<now> and passphrase=<provided>"]. This can be an in-memory service, or a database with an index of (TOTP time bucket, Passphrase) against the user's internal identifier. Consequently, for any given 6- or 8-digit OTP passcode, it is straightforward to look up the list of users for whom the passcode is valid, for that given time bucket. Naturally the memory structure or database should be purged at the same time as bulk update, to avoid exponential growth. Once the small list of matching users is obtained, it should be straightforward to perform a speaker identification call for the set of registered profiles of those users to determine which one matches. Additionally, or alternatively, in some embodiments a specific question could be displayed to the user, thereby prompting the user to speak and provide a verbal answer to the question. For example, a written request of "What is your name?" or a variant thereof ("Please state your name", "Who are you?", etc.) may be displayed to the user, thereby prompting the user to verbally provide their name.

Referring back to the authentication session, for speaker Identification, if there are multiple profiles with a similar match score, then the access/session management system may fall back to an additional speaker verification sample, for additional verification. This will be most appropriate if there are a small number of potential matches, of a similar match score—or if the match (or matches) are of a comparatively low but not insignificant likelihood. Alternatively, if there are a low number of high matches, it may be acceptable to iterate over the pass phrases for TOTP verification and test for a match. For speech recognition, if there are multiple phrases of a similar likelihood, then the access/session management system should display a list of the likely phrases together with a check image, calculated from the ordered list as exchanged during registration/reciprocation. For example, in some embodiments, the algorithm for testing for a match may include certain rules to improve accuracy, such rules including, but not limited to, accounting for whether phrases differ only by virtue of plurality or tense, supporting a very finite definition of "low" number of matches (i.e., ten or less, five or less, etc.), supporting a very finite definition of "high" number of matches. Naturally, the algorithm must be the same as that used with regard to the check image. The actual phrase can then be confirmed by user selection.

Once an appropriate phrase has been determined and an appropriate user, the phrase is translated into an appropriate, one-time word sequence verification according to an algorithm described herein. For example, the phrase may be translated into a TOTP representation and validated against the seed secret held for the given user. If a match is found, the user is identified in a positive authentication result, provided to the relying party. If a match is not found, the authentication result returns failure.

FIGS. 13 and 14 illustrate a system providing a spoken authentication service including a user agent-driven voice profile and phrase verification authentication model using a mediated, access/session management system-derived session exchange. As will be described in greater detail herein, the user agent stores and verifies voiceprint identifiers and is responsible for ensuring the identification matches. It should be noted that a given session identifier is generated by the access/session management system in the same tripartite relationship previously described herein. However, for a spoken authentication service, the identifier consists of three or four words to make a statistically unique sequence, and hence draws from a global dictionary that might be quite extensive. The phrase is dictated into the user agent running on the smartphone, which then attempts a speaker identification call and allows the user to select the correct phrase from a list of candidates. The session is then realized by the standard authentication mechanism previously described herein, albeit for a session identifier in a phrase format.

This approach inherits all the security advantages of the authentication techniques described herein with reference to, and shown in, FIG. 5, but adds additional features in the form of secure speaker identification and check-image CAPTCHA. This approach also benefits from a spoken transmission of the session identifier rather than a QR Code (which requires pointing a separate camera at the computer screen—possibly violating on-site security preferences with sensitive on-screen data.). There are also privacy safeguards, such as the capability to hold a speaker recognition profile ID only with the user agent and not the shared with an access/session management system.

FIG. 13 is a block diagram illustrating an exemplary registration session in which a user's smartphone that has already undergone an initial registration procedure of FIGS. 4A and 4B further registers additional authentication factors, namely speech and voice identification and recognition factors.

The registration session generally follows the process previously described herein with reference to, and shown in, FIGS. 4A and 4B. It is anticipated there will be some prior credential, whether that be an external system or a bespoke, internal system such as a username/password stored in a hashed/salted database (or some other prior trust model) as a precursor to entering the registration process. In that sense, inline registration is an elevation of an existing credential. In alternative embodiments, registration may be a separate, bespoke step that is initiated through a registration portal. In that flow, there is no need for a prior credential, and the end result is just registration, not an in-situ authentication at a relying party.

Upon completing the initial registration (by entering a verification code, the final step of registration) the user is now prompted to register speech samples on the smartphone. It should be noted that this may be an optional step. For example, the availability of speaker recognition as an additional authentication factor may be represented by an additional data item in the reciprocation data payload provided to the user via the registration portal (i.e., in the form of a flag, or optionally a URL, to which the user-specific speaker identifiers should be registered once speaker registration is complete).

A preset phrase may be displayed, via the smartphone, such as prose or a poem, in stages to collect samples to submit for speaker identification sampling. As previously described, a speaker identification service will generally require a minimum amount of sampled free speech (i.e., at least 30 seconds) but often a longer sample improves subsequent matches. Once sufficient samples are processed, the speaker identification service will register the speaker's profile and return a speaker identification profile ID, which is stored within a voice data repository of the smartphone (in the form of a voice data identifier).

In some embodiments, the user might be registered with an additional service, such as a speaker verification service, which involves dictating a known, stock phrase that may be used to confirm the identity of the user in future scenarios in the event that the speaker identification match is inconclusive. The resulting speaker identification profile ID may also be stored within the voice data repository of the smartphone.

Furthermore, in some embodiments, the resulting speaker recognition identifiers are registered with the access/session management system, against the speaker registration URL provided in reciprocation data. In alternative embodiments, for privacy purposes, the speaker recognition identifiers might not be sent to the access/session management system, and may be held locally on the smartphone. In such a scenario, the smartphone is the sole medium for establishing all factors of the user identification.

FIG. 14 is a block diagram illustrating an exemplary authentication session including use of a spoken passphrase as an additional authentication factor used in the authentication process. The authentication session generally follows a similar authentication session process as previously described with reference to, and shown in, FIG. 5. However, there are some key differences, as described herein. For example, the public session identifier in a request-session response is now a passphrase of three or more words. The passphrase is generated randomly from an extensive ordered dictionary so that each word forms a number in a number base system. The dictionary should hold enough entries to ensure the session identifier passphrase is unique. For example, with a 1,000-word dictionary and a random three-word passphrase, there are 1000^3 permutations (or 1,000,000,000 unique session identifiers). The session identifier is requested of the access/session management system by the relying party, in a different runtime to that hosting the smartphone, such that it may be a physically disparate processing unit, and does not need, even, to be on the same network.

Another difference is that, for a multi-mode access/session management system, it may be necessary to offer the user a choice of the type of session identifier and the method of delivery. For example, a user of the initial authentication session (referencing FIG. 5) might require a session identifier as a scannable QR code, while a user of the spoken authentication session (referencing FIGS. 12A, 12B, and 14) would require a three-word session identifier passphrase.

Furthermore, the passphrase may be displayed on the device that hosts the relying party's invocation of the access/session management system, together with a check-image calculated algorithmically from the unique phrase. This algorithm is also known by the smartphone.

Another difference is that the user now dictates the passphrase directly into the smartphone, which may require other biometric/PIN entry (such as a fingerprint) to open the application. This dictation replaces the QR code scan (or instant messaging transfer of session identifier scheme). Additionally, the phrase is submitted for speaker identification, to assert that it matches the registered speaker identification profile on the smartphone. There are various ways to achieve this depending on the privacy setting, as previously described herein.

Additionally, if the speaker identification service returns a positive match against the registered profile, the phrase is submitted for speech recognition, to discern the actual words spoken. Typically, this will result in a small number of phonetically similar candidate phrase matches. If there are a small number of similar phrases, these are displayed for the user to confirm which one was spoken. The check-image is also displayed for each phrase and to aid a visual match with the check-image shown on the screen of the relying party's session.

In the present embodiment, the user realization request is now composed and sent to the access/session management system. This is a standard authentication process in accordance with the systems and methods described herein, except that the session identifier is a phrase instead of a random globally unique identifier (GUID), with additional data to confirm the speaker identification match. Typically, this might be the URL of the speaker identification system's call to fetch the match result or if the speaker identification call is proxied to the access/session management system.

Furthermore, the standard enquire session functionality, used in the authentication session previously described herein, may now be used to establish the session and obtain the authenticating user's identifier with the relying party via the access/session management system holding the realized session data.

Accordingly, the present invention provides a secure and easy-to-use system for employing a single chosen device (such as a smartphone) as sole required proof of identity for all future authentication purposes, thereby providing credential-less or near credential-less authentication and verification techniques.

Figure 15:
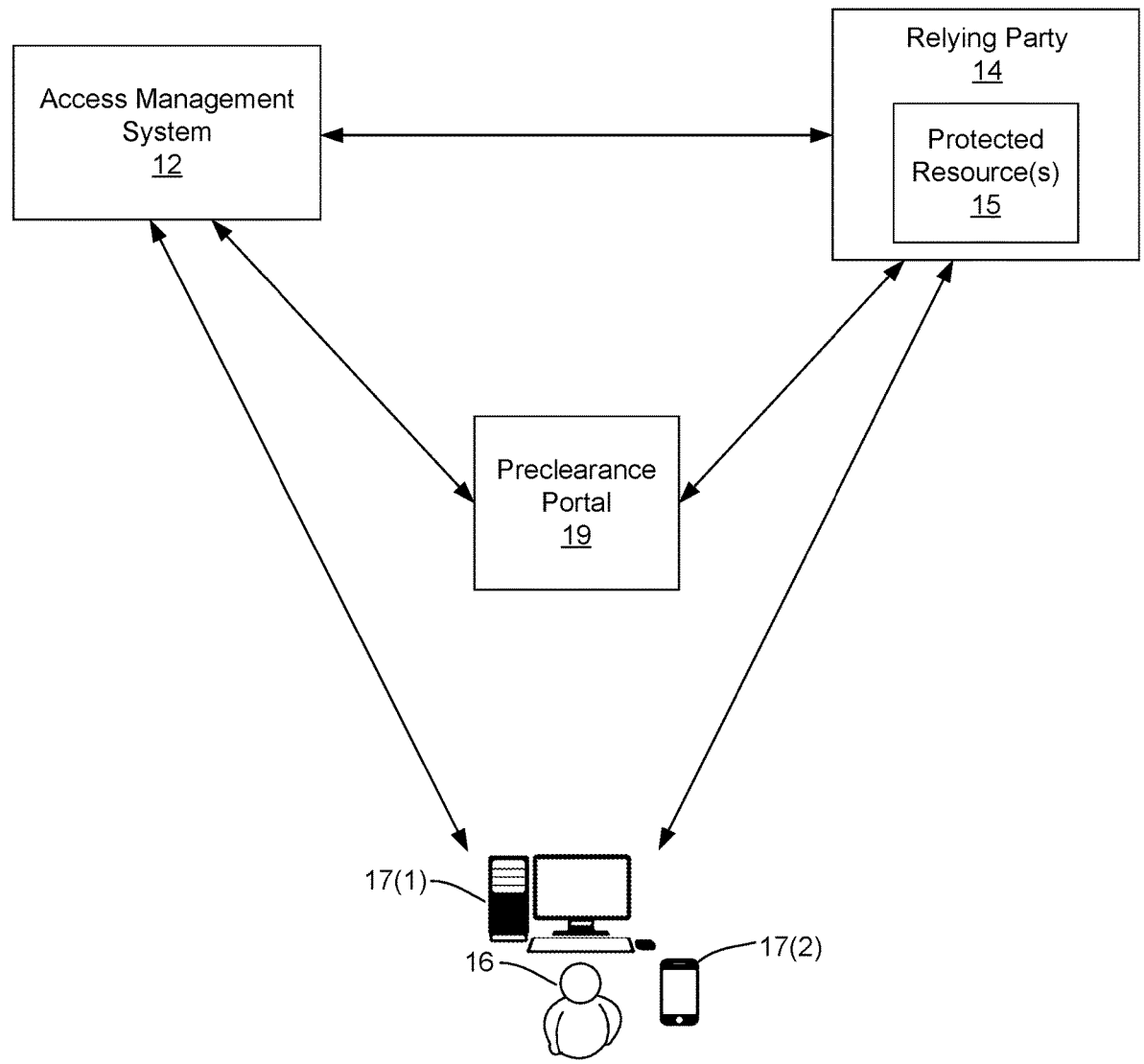
FIG. 15 is a block diagram illustrating an authentication system consistent with the present disclosure, including incorporation of a preclearance protocol consisting of a set of authentication events required by an access/session management system to establish clearance (user access permission) prior to any interaction with a provider of protected resources (i.e., relying party).

The systems and methods of the present invention may further include the concept of preclearance protocols, which generally consist of a set of authentication events required by an access/session management system to establish clearance (user access permission) prior to any interaction with a provider of protected resources (i.e., prior to a user sign-on to establish connection with a relying party to access a protected resource provided by the relying party). The preclearance protocols can be used to establish a single sign-on (SSO) context, as will be described in greater detail herein. FIG. 15 is a block diagram illustrating an authentication system consistent with the present disclosure, including incorporation of a preclearance protocol, including use of a preclearance portal 19, in which the protocol consists of a set of authentication events required by an access/session management system to establish clearance (user access permission) prior to any interaction with a provider of protected resources (i.e., relying party).

By way of background, in the domain of identity providers (IdPs), there is a clearly defined mechanism for establishing a single sign-on session by first interacting with the IdP, which is referred to as an IdP-initiated single sign-on (SSO). The term "single sign-on" generally refers to services that, after a user logs into one application, automatically logs that user in to other applications. The IdP-initiated SSO typically involves completing all authentication steps by direct interaction with an IP prior to forwarding to the relying party with an unsolicited assertion statement that the relying party may then interpret as an instruction to permit access to the protected resources on behalf of the named user in the authentication assertion.

The present invention contemplates that there is a degree of cross-over in a feature that is set between preclearance and IdP-initiated SSO. However, preclearance may generally be associated with one login event and may not necessarily relate to a SSO session. Furthermore, preclearance has a clear delineation of actors and their responsibilities and mandates that there be no persisted authentication context with the relying party. The systems of the present invention provide for a preclearance protocol to establish a single sign-on context, on a separate device to that which hosts, or is used to access, the relying party. This protocol is a divergence from the notion of a SSO session being granted to the component (i.e., hardware, browser, or network) on which the user will access subsequent relying parties.

The systems and methods of the present invention may include at least two different preclearance concepts, including a sandboxed authentication credential protocol and an isolated authentication session protocol, wherein each preclearance concept involves separating an authentication event from an inference of that event in terms of session and access management, each concept aimed at removing traces of user context from outlying layers during credential entry.

By way of overview, the sandboxed authentication credential protocol involves a central concept of allowing the authentication to take place within an environment completely separate from the environment on which the relying party, with its protected resource, runs. The term "environment" in this context may generally refer to a separate device, server, network, a separate application, or a separate browser. The sandboxed authentication credential protocol generally involves isolating the credential exchange and lifecycle, resulting in a single, limited usage temporary credential. As will be described in greater detail herein, the sandboxed authentication credential protocol allows for the management of multiple factors and lifecycle variants separately from the relying party UI, and further allows for the generation of a temporary credential that meets the requirements of the relying party's UI but without exposing the underlying originating credential. The isolated authentication session protocol generally involves managing all authentication exchange, including initiation of access to any pre-identified relying party, from a separate, isolated device. It should be noted that, in each of the two preclearance concepts described herein, it is assumed that the relying party is configured to trust assertion statements from the access/session management system, such as by way of a certificate exchange or key pair integration, so that the relying party can validate the authenticity of the access/session management system generating an assertion statement, and no additional party may even be able to decipher the content due to encryption.

Figure 16:
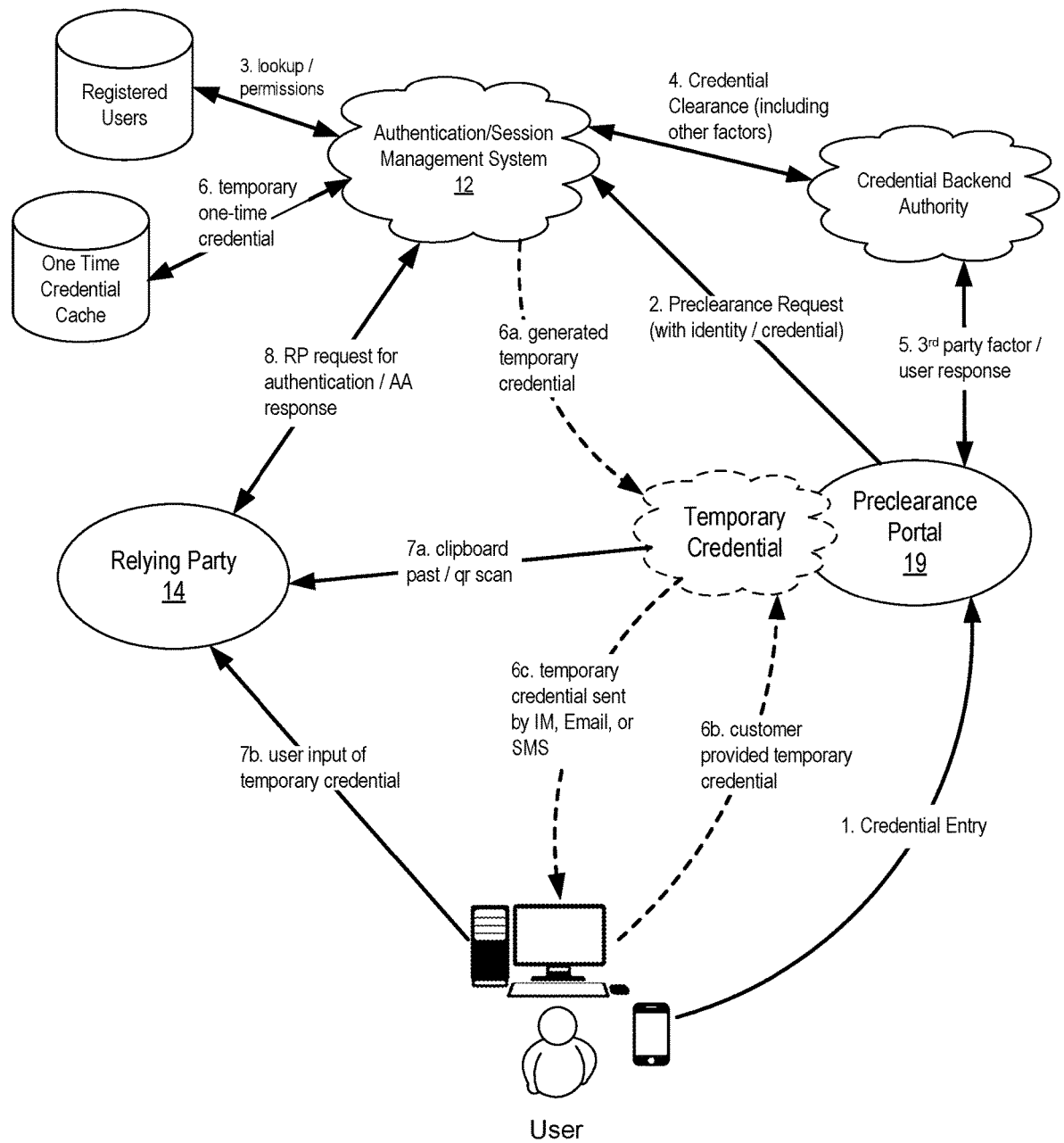
FIG. 16 is a block diagram illustrating one embodiment of a sandboxed one-time credential method of authentication consistent with the present disclosure.

FIG. 16 is a block diagram illustrating one embodiment of a sandboxed one-time credential method of authentication consistent with the present disclosure. This mechanism is initiated by a user visiting a preclearance portal 19. The preclearance portal 19 may be embodied as a completely separate device/browser/network from the device on which the eventual relying party 14 will be accessed. If, however, it is the same device, various conveniences might be exploited, such as use of a common clipboard.

The sandboxed one-time credential protocol is a mechanism for separating an authentication event from any authentication, including credentials entry, required by a relying party. This separation allows for the generation of a temporary, one-time credential that is used instead of requiring entry of actual credentials. The temporary, one-time credential is then safe to be entered, scanned, or even copy and pasted into the UI that requires credential entry, as the one-time credential relates to a given authentication event, as opposed to being attached to any given user for any duration. More specifically, it is the event that ties to the actual, underlying user identity, and not to the credential. Accordingly, such a protocol allows for the authentication event to be more secure and/or stronger than the credentials entry UI allows.

For example, it should be noted that the authentication event may be understood to be a full set of factors, scans, biometrics and the like that the access/session management system requires, which is full authentication. The authentication event results in some one-time token that may entered into a simplified user interface (UI) outside of the access/session management system's direct interaction (e.g., within a relying party's UI) that may then be presented to the access/session management system to discover the originating user's secure identity (e.g., username, or some other metadata stored for replay to that relying party). The authentication is that particular token, which is essentially an artifact that relates to the previous full authentication (event).

One scenario is entry into a relying party's legacy UI. In such a scenario, that one-time preclearance token will likely be in the format of a temporary credential (either a username/password or both, which may be a variant of the actual user's username but preferably would be entirely devoid of originating user traceability). It should be noted that it is not a temporary credential, but a time-limited, one-time use token in the format that suits the relying party. Accordingly, in some scenarios, the other component of a full credential might not be validated (e.g., if the preclearance token is a username in email address format but the UI mandates a password entry, the password might not be checked). It is even possible the password alone will represent the preclearance token, which may be preferable, as a password will likely have fewer format constraints, although must have its complexity rules obeyed. In this scenario, the entered username might be ignored by the access/session management system, particularly if the originating user is identified via the password (wherein the real user should be discouraged from entering their actual email address in that scenario). To discern from a brute-force/invalid credential scenario, the preclearance token will likely including a built-in format discernment mechanism, such as checking digits or magic bytes s to identify as a valid preclearance token, not some random password attack.

In some embodiments, the token is a one-time token, but a variant might include allowing the token for a time-limited with multiple uses, which is akin to SSO, but managed via a user-mediated token, not a system stored mechanism like a cookie.

In still yet another embodiment, the preclearance token entry UI may be hosted by the access/session management system. In such a scenario, the UI may facilitate a user-entered manual SSO feature as described above. One usage may include migrating an authority-mediate SSO session on one device to another (the preclearance token represents the SSO session launched through an initial secure authentication). Another usage is to remove the authentication entry from the one device, or even the QR "host" to another device.

One application of a sandboxed one-time credential scheme is to provide multi-factor authentication where a legacy client UI or relying party doesn't support it. In such a scenario, the user may start their conversation at a preclearance portal where they complete all factors mandated of them, and may then chose any combination of options for the creation of a temporary, one-time credential. The combination of options may include, but are not limited to, a temporary one-time username, supplied by the user, a temporary one-time password, supplied by the user, a generated version of either of the above, an augmented version of the standard username with a prefix or postfix of a temporary OTP, and, in the case of a portal on a mobile device, a QR code that the authenticating UI is capable of scanning.

A core tenet of this concept is the capability of the access/session management system to also act as the authentication agent for the relying party. Accordingly, the access/session management system may act as a broker to an underlying authentication mechanism, such as an Active Directory, a Lightweight Directory Access Protocol (LDAP), or an IdP, at least based on the fact that the temporary credential must be referenced to the actual authentication event, in order to apply the correct user context in the backend.

As illustrated in FIG. 16, the authentication generally occurs in a secure, detached environment, completely independent of the relying party, and, more preferably on a different device and/or network. The user may initiate an authentication session directly with the preclearance portal, in which multiple factors are directly entered and a preclearance request is transmitted to the access/session management system. The authentication session initiation, including the entering of multiple factors (i.e., credential entering), takes place via the preclearance portal 19, which is a separate device (hardware/application/browser) to the device which will be used to access a relying party. The authentication session transfer token can be one of: a QR code generated by the access/session management system, ready to be scanned by the Relying Party; a user-provided text (a user "secret"); a pre-generated textual token; and an identifier sent by near-field communication, such as infrared, Bluetooth, or NFC. In some embodiments, the user-provided text may be facilitated by displaying to a user a block of random letters/symbols and requesting that the user highlight and copy a section to clipboard, then paste it into an entry field, and subsequently the user can paste it a second time into the relying party hosted UI. In some embodiments, the pre-generated textual token may be copied to a clipboard or temporary memory auto-populated into data entry fields on the relying party. In other embodiments, the pre-generated textual token may be displayed as an OTP that the user is then required to key in at the relying party. Yet still, in other embodiments, the pre-generated textual token may be composed of one or more words the user might narrate at the relying party.

It should be noted that, for legacy relying party interfaces (e.g., composed of only of a username/password entry UI), the session transfer token may be: entered as the password; entered as the username, while the original password is retained; entered as both the username and password, where the session transfer token is configured to be two-part; and entered as a prefix or postfix to the original username or password. In the instance that the session transfer token is entered as the username (while the original password is retained), the relying party must not trust the username to be the user "identity", as this will be transmitted from the access/session management system after the relying party has requested an assertion statement from the access/session management system. Furthermore, this option has the additional security check of the password being, possibly, authenticated again but against the actual username/identifier, to which this "token username" maps. In the instance that the session transfer token is entered as a prefix or postfix to the original username or password, the session transfer token may be akin to an OTP and thus it should be long enough to be non-brute-forceable, but short enough to fit within a password entry field, with the password itself.

As illustrated, the authentication session (via the preclearance protocol) occurs prior to arriving at the relying party. For example, the session may occur in a separate connection between the user agent and access/session management system. The session may occur, for a most secure experience, on separate hardware with a separate network connection. For maximum security, the session may occur using a secure bonded device. In some embodiments, all data entry might be directly on the user agent, rather than a separate client portal. It should be noted that, in some embodiments, it may be possible for the user to select the relying party to which a given authentication session will be applied, which will then be enforced by the access/session management system, such that authentication will not be shared with other relying parties.

Figure 17A:
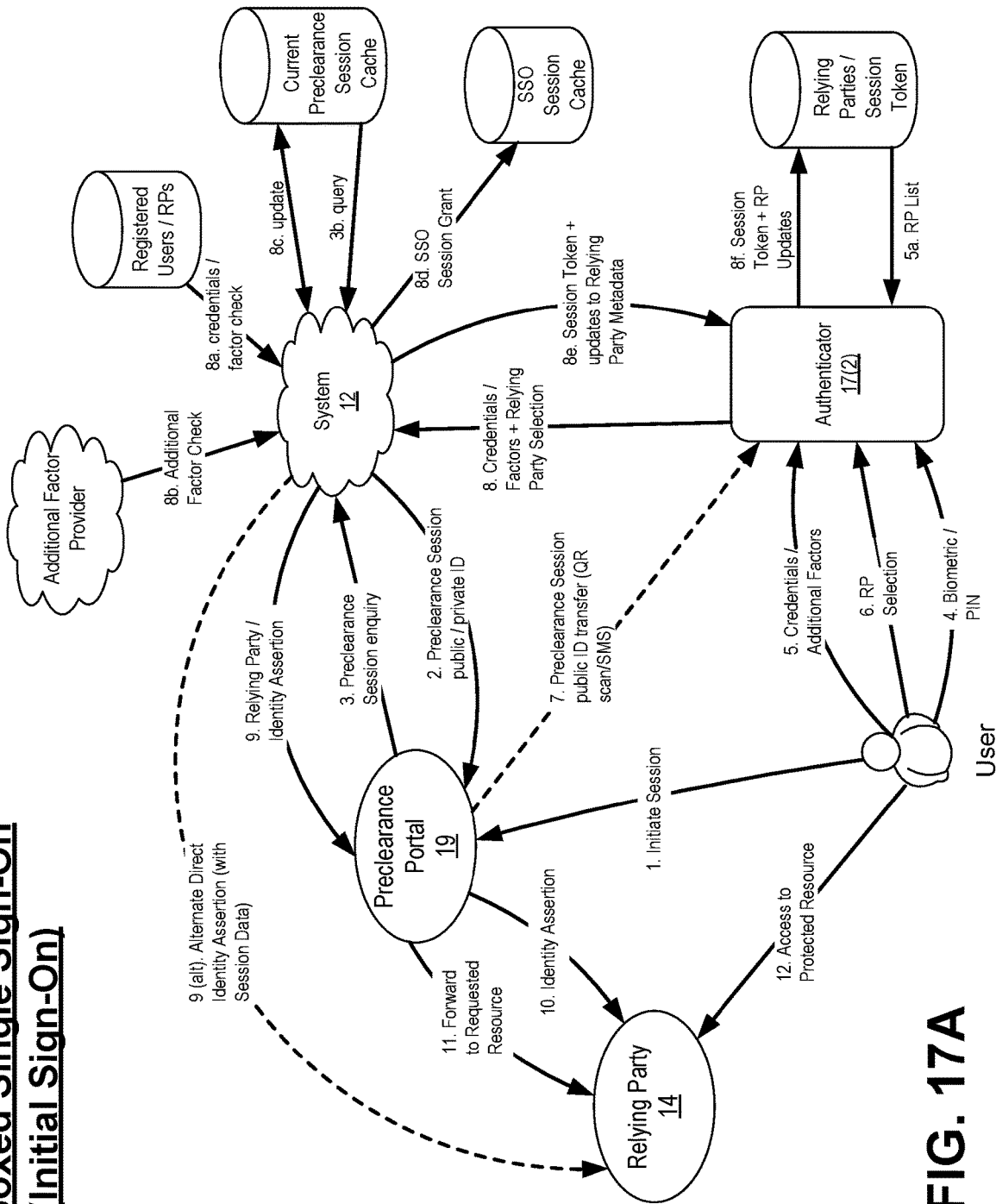
FIG. 17A is a block diagram illustrating one embodiment of a sandboxed single sign-on method, depicting an initial sign-on process consistent with the present disclosure.

FIG. 17A is a block diagram illustrating one embodiment of a sandboxed single sign-on method, depicting an initial sign-on process consistent with the present disclosure. The sandboxed single sign-on method establishes an initial sign-on and creates a single sign-on token the user may then utilize for subsequent authenticated relying party accesses predicated based on the one sign-on event, depending on the duration of the single sign-on token that has been granted. The expiration of the single sign-on token may be pre-configured and may be further hastened based on any detected unusual activity (e.g., incongruous geographical accesses, banned/blocked IP ranges, unusual user activity, etc.).

The sandboxed single sign-on method begins with a user accessing a preclearance portal and initiating a preclearance session (step 1). In turn, the preclearance portal requests a preclearance session with the access/session management system. The access/session management system issues a public preclearance session identifier and a private preclearance session secret (e.g., the latter is cryptographically related to the former such that there is one secret for one identifier) (step 2). The preclearance portal makes repeated enquiries to the access/session management system to enquire the status of the public preclearance session identifier. By also providing the private preclearance session secret, the access/session management system establishes provenance (step 3).

The user is able to then navigate to a separate user agent disconnected from the device on which the preclearance portal is hosted, which will eventually host any relying party session. It should be noted that this may include a mobile device, possibly managed by an organization using mobile device management (MDM), with a specific application installed to manage an exchange of information/data. For example, at this stage, the user may be prompted to provide some biometric/PIN confirmation of identity to access the preclearance features (step 4). All credentials are then entered, as pre-registered with the access/session management system (or an underlying credentialing service to which the access/session management system acts as broker) (step 5). The user may then be able to select from a pre-shared list of relying parties (step 6) and the preclearance session identifier may then be scanned (step 7). The credentials and relying party preclearance session identifier are then sent to the access/session management system (step 8). In turn, the access/session management system confirms all factors and the credentials provided (steps 8a and 8b). The relying party selection is then confirmed as accessible/registered to that user. A "current preclearance session" cache may be updated to contain such details, against the public preclearance session identifier (step 8c) and a SSO grant is written to a SSO session cache, which represents the single sign-on capability of the user, and will expire at a predetermined time (step 8d).

The access/session management system then sends a response to the user agent (step 8e), including: the SSO token grant, possibly with expiration data and any changes to the relying party setup for the user, to be stored on the user agent for access purposes in future (step 8f); and any revocation of grants, in which the user agent should update its metadata to save a future "permission denied" response.

The access/session management system may now send an authentication assertion to the relying party, containing the user identification and time of authentication event (step 9alt). For example, the authentication assertion may be provided to the relying party via a SAML Request forwarded from the user's browser. The preclearance portal may performed this step based on a payload received from the access/session management system once the preclearance session is realized (i.e., a SAML Response with the originating user's username). The SAML Response with the originating user's username may appear to the relying party as a IDP Initiated sign-on, for example. Subsequently, the next valid "enquire-session" request from the preclearance portal will cause the access/session management system to find the "realization" data stored in the preclearance session cache. The access/session management system will then return: a "success" status; the URL of the Relying Party, to which the Portal should now forward (step 9); or a packaging of the authentication assertion that matches the user credential provided, that should be transmitted to the relying party with the forwarding (in which browser-based form submission is required) (step 9).

The relying party is then forwarded (step 11) with the assertion (step 10), and the user may interact with protected resources appropriate to the protected resource(s) to which they have been granted prior access (step 12).

Figure 17B:
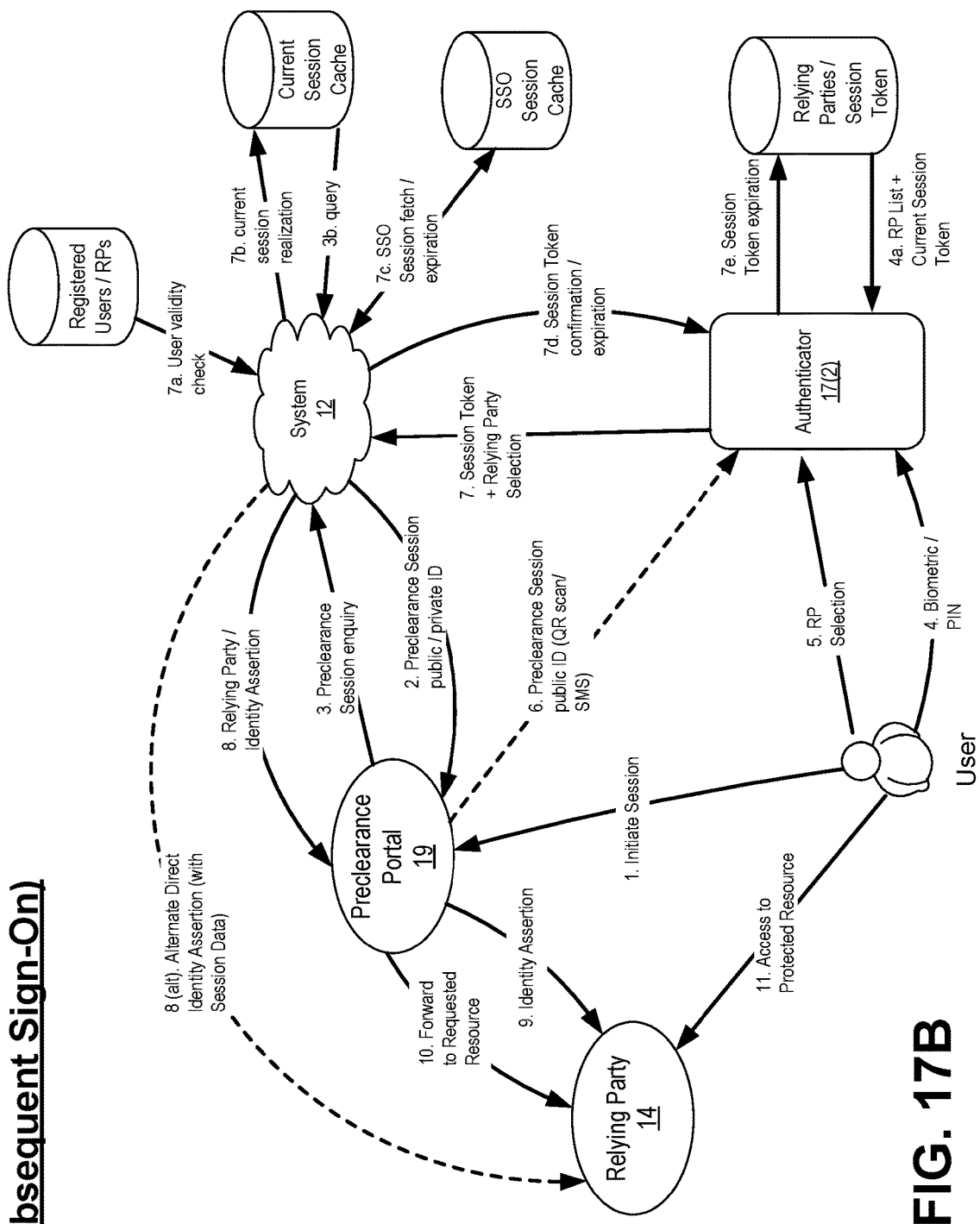
FIG. 17B is a block diagram illustrating the sandboxed single sign-on method, depicting a subsequent sign-on process consistent with the present disclosure.

FIG. 17B is a block diagram illustrating the sandboxed single sign-on method, depicting a subsequent sign-on process consistent with the present disclosure. The subsequent sign-on process may be used to gain access to further pre-configured relying parties without the need for full authentication, as is the case with the initial sign-on process of FIG. 17A. Fundamentally, the user agent must manage local biometric/PIN accesses appropriately, wherein, if a device is reset or the biometric data used to access the preclearance application changes, any and all tokens must be revoked. This is, possibly, enforced through MDM and/or various features, such as attestation from mobile-oriented key grant authorities.

The general flow of the subsequent sign-on process illustrated in FIG. 17B is simplified as compared to the flow previously described for the initial sign-on process of FIG. 17A. As usual, the user navigates to a contextless, or near-contextless, preclearance portal (step 1). For example, in one instance, there is no user context (i.e., no cookie/saved form or even username entry box). As previously noted, a public preclearance session identifier and associated private preclearance session secret are obtained (step 2) and repeated enquiry calls made to determine the status, based on the public identifier with its associated secret (step 3). A biometric or other (such as a PIN) is used to open the preclearance app on the user agent (step 4) and a list of pre-configured relying parties is fetched, and the existing, non-expired SSO session token is retrieved from secure local storage (step 4*a*). As there is an existing SSO token (i.e., the "sign-on pass" is still valid), there is no need for additional credential entry. Rather, the user simply selects the relying party they would like to access next (step 5). The public preclearance session identifier is scanned at the user agent (or sent via SMS text depending on the user instruction on-screen and subsequent telephone/IM username entry) (step 6).

The session token together with the relying party selected is sent (encrypted/signed according to prior key exchange) to the access/session management system (step 7) and various checks carried out (step 7*a*). If the token is found to have expired, it is expunged (step 7*c*) but if not, a current preclearance session record is written to the preclearance session cache, as previously described. A response is sent that may indicate expiry or success/failure (step 7*d*) that may cause the user agent to discard an expired session token (step 7*e*).

In the case of success, the access/session management system continues to permit the session and forward the preclearance portal browser session to the appropriate relying party, in which steps (8-11) are identical to the process discussed in steps 9-12, respectively, of the initial sign-on process described previously herein.

The sandboxed single sign-on protocol described herein allows a sign-on pass metaphor, where a user can establish a single sign-on context on a discrete device. Similar to standard single sign-on experiences, this may involve an authentication phase where several credentials are entered in a multi-factor authentication lifecycle, and as such establish a strong authentication. Once that authentication is established, a single sign-on grant occurs, such that subsequent accesses to other relying parties can be fast-tracked without the need to re-authenticate. However, the primary invention with preclearance is the capability to package the single-sign on grant in a token stored securely on an entirely separate device. Once established, that "sign-on pass" can be used to automatically sign-on in any preclearance portal on any hardware/software/browser/network environment, without requiring any special software to be running on that environment, which presents significant advantages.

For example, there is no need for user context whatsoever provided on the device that hosts the relying party software, as the initiating preclearance portal works with a context-less session requiring no credential entry whatsoever. Furthermore, the preclearance session is then given context via realization, which includes a "success" response from the enquire-session invocation. This means there is no cookie or cached data on the client environment at all (unlike standard SSO "cookies" left by IdPs). Furthermore, the authentication assertion arrives at the relying party directly from the access/session management system, and not (necessarily) via some intermediary, which ensures tamper-proofing or capture of the assertion. Additionally, the relying party is arrived via forwarding from the preclearance portal, via data retrieved from the pre-configured relying party metadata, which eliminates the possibility of mistyping the URL and being phished. The recurring theme of "user revelation only once authenticated" is honored in this instance, resulting in a reduced possibility of phishing a user identifier since identifiers are only exchanged from access/session management system to relying party, as opposed to being entered in a browser.

Furthermore, the sign-on pass is retained on a different device and activated via preclearance session realization, which results in the single sign-on metaphor being honored entirely, across devices if required. Also, the nature of single sign-on in browsers requires that sign-on context be retained locally, in a cookie, such that, if a device is compromised on which a current single sign-on cookie/token is stored, all the relying parties to which the user has access can be visited and compromised. However, this is not true with the preclearance/sandboxed sign-on protocol of the present invention because there is no session data retained on that device. Accordingly, if stolen, only the currently accessed relying parties can be compromised. Furthermore, preclearance/sandboxed sign-on protocol of the present invention allows for the possibility to perform a "local logout" (as opposed to single log out) for each relying party. For example, at present, if a user logs in to a relying party with a single sign-on mechanism provided by conventional Identity Providers, in theory they may only log out using single log out because the single sign-on cookie will still be present, allowing the user to be automatically logged back in again. However, in accordance with the preclearance/sandboxed sign-on protocol of the present invention, there is no session cookie on the local device, such that it is possible for a user to logout of only one relying party and remain logged in to others in, say, other browser tabs.

FIG. 18 is a block diagram illustrating one embodiment of a One-time Password (OTP)-based bonded sign-on method, depicting use of a bonded device to carry out a portion of a sign-on process utilizing an OTP consistent with the present disclosure. This OTP-based bonded sign-on method is an extension of the sign-on pass metaphor previously described herein and hosted on a bonded device for sign-on purposes. It should be noted that much of the process flow is similar to the sign-on methods described with respect to FIGS. 17A and 17B, but with a key difference: the user agent system is not required to issue a single sign-on token and does not enter a SSO mode. Rather, the ease-of-use of the bonded device with a canonical secret is exploited to its fullest potential. Furthermore, there is no requirement to scan a preclearance session identifier and no request-session/enquire-session polling mechanism. Instead, the canonical secret is used to generate a one-time use TOTP that acts as the session identifier.

As illustrated, a user navigates to a portal on the machine they wish to access a pre-registered and configured relying party. The portal displays a one-time passcode entry form. At this point, the user accesses their pre-registered/reciprocated bonded device and completes biometric validation as usual (step 1). The user may select from the list of pre-registered relying parties on their pre-bonded device (steps 1*a* and 2). In turn, the pre-bonded device contacts the access/session management system and sends a specialization of a "realize session" payload referred to as an "identity realization" (step 3). The identity realization does not include a session identifier, since no session has been scanned. The identity realization includes a relying party, or reference to a relying party, that the user selected in step 2, the TOTP from the canonical secret (step 3*a*), and, in some instances, a signature to prove that this payload was generated using the key pair the user agent generated at reciprocation. The access/session management system stores various data for a pre-determined and short-lived "session time" (e.g., 30 seconds) in a session cache (step 3*b*). The data includes, for example, the details of the relying party, the details of the realizing user (e.g., the subset of data held about the user that the identified relying party will require to honor access to the protected resource; and the time-oriented OTP current for that user (i.e., the unique OTP that applies for that user for that time period from the canonical secret shared with the bonded device at the time of initial registration, which may be used as the "key" to the cache. It should be noted that the cache ensures uniqueness in the extremely rare event of a duplicate OTP concurrent for more than one user. For example, the second attempt to cache the same OTP causes an error and rejection. In such a scenario, a new OTP can be generated by the access/session management system and returned in the response to the identity realization request (step 3*c*).

The user agent device then displays the OTP (step 4), which is the OTP from their canonical secret shared securely at the initial registration, or, in some instances, the alternative OTP returned from the identity realization request. In some embodiments, the OTP may optionally be specific to the relying party (i.e., it is not a universal canonical secret but either (a) one skewed by the relying party's registration "id" or (b) an entirely unique secret, shared securely and peer-to-peer between the access/session management system and bonded device previously. The OTP is then entered into the portal by the user (step 5).

The preclearance portal then requests session details from the access/session management system for the given OTP (step 6). The access/session management system then: sends an authentication assertion to the relying party, containing details of the activating user (step 8*b*); and returns an appropriate response to the portal (step 7) for it to forward to the requested protected resource (step 8). This may include all appropriate authentication assertion data for the relying party to permit access to the protected resources. The preclearance portal then forwards to the protected resource (step 9) and access is granted (step 10).

The benefits of the OTP-based bonded sign-on method are fairly self-apparent. The key to this mechanism is the complete redundancy of a single sign-on metaphor: instead the user is completing a full authentication each time by virtue of possession of a bonded device and completion of local biometric authentication. The benefits of the sign-on pass are also accrued, with a neutral and user context-less client environment that does not allow exploits of single sign-on cookies, tokens, or beacons. No user credential is entered and so may not be gathered by keyloggers. The relying party data includes a registered protected resource URL, and so may not be susceptible to mistyping and/or interception.

The use of the OTP mechanism means a relaxation of the standard request-session/enquire-session polling. Rather, the event trigger is the entry of the OTP, which leads to a more efficient overall experience. An additional advantage is that no camera lens is required to be pointed at a restricted computer screen—this may be contrary to corporate policy as sensitive information might be photographed.

Figure 19:
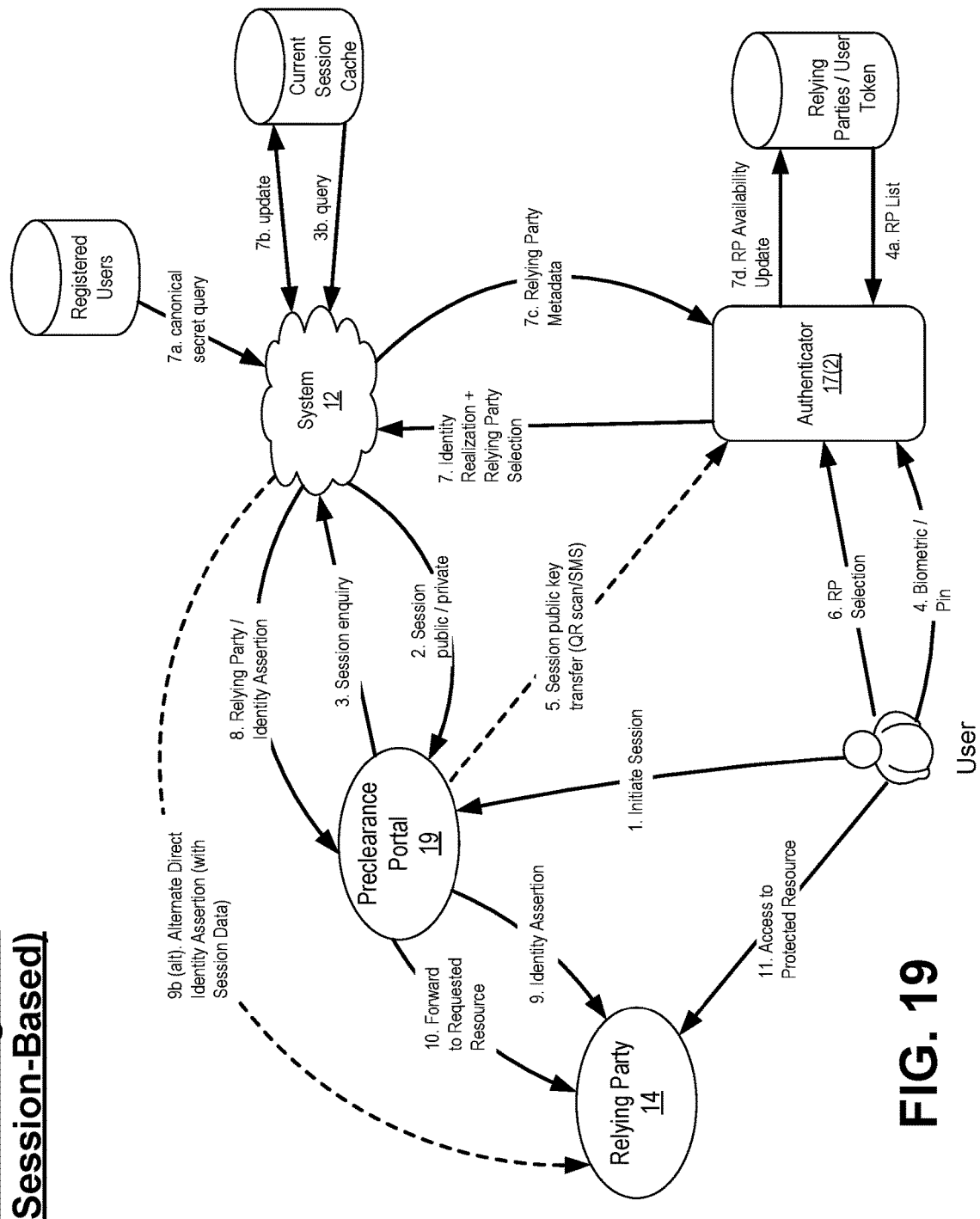
FIG. 19 is a block diagram illustrating one embodiment of a session-based bonded sign-on method consistent with the present disclosure.

FIG. 19 is a block diagram illustrating one embodiment of a session-based bonded sign-on method consistent with the present disclosure. As illustrated, the user launches an app on their user agent device, which has been previously registered with the access/session management system and established as a bonded device, through which a canonical secret has been shared, securely. The user then completes biometric/PIN authentication as previously described (step 4, but can happen before step 1). At this point, the user navigates to the preclearance portal to the access/session management system on a separate device/network (preferably this is the device that will eventually host the relying party interaction) (step 1).

Without any user context (i.e., with no user-identifying data entry) the user requests an anonymous preclearance session, the user requests a non-specific preclearance session that the access/session management system grants in one of many forms (step 2), such as: a QR code the mobile app can scan; a statistically unique PIN code that must be entered into the user agent; and/or a spoken session identifier. It should be noted that this preclearance session may not be tied to the user or application in any way, or even to the user's corporate account. However, it may be restricted by account, department or even (subset of) user(s), depending on configuration options offered by the Authority and chosen by the administrator of the corporate account.

The user now selects a pre-registered relying party, or alternatively chooses a relying party they bookmarked or entered themselves, which may include a more specialized protected resource within a pre-registered relying party context. This is the relying party service they will choose to launch, pre-authenticated. It should be noted that, at this point in time, the user agent has not contacted any other access/session management system or relying party (step 6).

The access/session management system maintains this "preclearance session identifier code" for a predetermined period, awaiting a user realization, and further making "enquire" calls to the access/session management system, for that public preclearance session identifier that they prove this instance requested by supplying the preclearance session secret (step 3). The user now either scans the QR code or enters the PIN code into the pre-registered bonded device user agent (step 5) and the user agent sends a "realize-session" response to the access/session management system (step 7) consisting of: that given session identifier, so that they are realizing a single instance of a hosting session; and relying party identifying information, corresponding to the relying party they selected in step c. It should be noted that this payload is preferably signed with a key the access/session management system may use to validate against a previously shared public key sent during registration.

The access/session management system confirms the realization data and determines the user identity to which it pertains and checks their authentication token (steps 7 and 7*a*-*d*). If these and any secondary checks pass, the access/session management system sends an IdP-initiated identity assertion to the relying party and invokes the relying party service (or the restricted access page that the relying party metadata was pre-configured with) (steps 8 and 9, or step 9*b*).

The user is then forwarded to the requested resource (step 10) where access is granted automatically (step 11). Accordingly, subsequent access to other relying parties follows exactly the same process.

The session-based bonded sign-on method provides numerous benefits, including, but not limited to, credential-less authentication, context-less sign-on to registered relying parties, ease of use (i.e., there is no data entry required, only a scanning of a QR code and a biometric verification), full authentication each time (i.e., the user has to complete both factors of an owned bonded device and biometric before access to any relying party, which is unlike single sign-on where a previous authentication event is "inferred" as still valid), no exploit over extended session times, and zero client residue (i.e., no cookie/beacon/token left on the client device that will interact with the relying party).

The following description includes additional aspects of the present invention, including the following concepts: single user session enforcement capability; session transfer capability; and managed logout capability.

The single user session enforcement aspect allows for enforcement of each user to have only one session with a pre-registered relying party at a time, which involves either the user agent or access/session management system recalling a previously granted session with each relying party for a given user. In one embodiment, each session may have a session identifier sent to the relying party with the assertion (e.g., a relying party session identifier, not a preclearance identifier). In other embodiments, the relying party may support a "user logout everywhere" for that relying party only, for example. When the user requests a new session without previously having signed out of the previous session, the access/session management system is configured to send a logout request to the relying party, for either the user (the relying party should consider that one user to be logged out everywhere) or the user's session, recalled from a previous instance that the user invoked a preclearance session that was realized for that relying party.

The session transfer capability allows for transferring a previously interacted session that was not logged out of, to a new device via the user agent interacting with the access/session management system on the new preclearance hosting device. In particular, the session transfer capability of the present system does involve certain features provided by the relying party, including, but not limited to, the capability of the relying party to recall the user's last protected resource and/or navigation breadcrumb trail with that specific relying party. The session transfer aspect uses a similar mechanism as the single user session enforcement embodiment previously described herein, except: when invoking the session with the relying party on a new device without previously having logged out, the access/session management system identifies a possible ongoing session, which may result in the user being notified and offering the option to transfer the session, or involve the user selecting a preference on the user agent to always continue session if one already existed; and at the end of the preclearance session realization, the relying party is sent the session identifier in question, which is a relying party session identifier, not a preclearance identifier.

The managed logout capability allows for a preclearance-capable device to send a logout request to one or more relying parties (including all relying parties in some instances) or limit the logout request to be sent to only those relying parties that the access/session management system granted an authentication assertion to, without a corresponding logout request. It should be noted that the managed logout is much more than a single logout request in that the managed logout logs a user out everywhere. Additionally or alternatively, the system is configured to display those sessions that are believed to be active and let the user decide which sessions should be terminated. The system is configured to determine which session are believed to be active based on, for example: an IP address of the preclearance portal that hosted the session invocation with the relying party; and a form of user naming convention, such as each preclearance portal could be given a textual description by the user (e.g., "company macbook", "my iPad", "Bob's Home PC"). The preclearance portal may convey this description to the access/session management system when requesting a preclearance session. By using a named preclearance portal, the system may further be configured to also terminate only those sessions with relying parties on that portal.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, memristors, quantum computing devices, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Incorporation by Reference

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A computer-implemented method for authenticating a user by a system comprising a processor coupled to a non-transitory memory containing instructions executable by the processor, the method comprising:
   receiving, by the system, a request from an entity in response to attempted access to entity resources by a user via a primary user computing device;
   determining, by the system, whether the user is registered with the system; and
   initiating, by the system, one of a registration process and an authentication process with the user based on the determination;
   wherein a registration process comprises:
   establishing a peer-to-peer exchange of data between at least the system and the primary user computing device and a secondary user computing device;
   generating, via the system, an initial candidate secret and transmitting the initial candidate secret to one of the primary and secondary user computing devices via the peer-to-peer exchange;
   receiving a reciprocal secret from the secondary user computing device based on interaction between the secondary user computing device and the initial candidate secret, wherein the initial candidate secret is specific to the user and the secondary user computing device, and wherein the reciprocal secret is based on the initial candidate secret;
   generating, via the system, a canonical secret including a token and a random confirmation code and transmitting the canonical secret to the secondary user computing device via the peer-to-peer exchange ensuring a bonded device metaphor such that the canonical secret is a definitive secret only known and stored by the system and the secondary user computing device, wherein the token is associated with an expiry date and is stored on the secondary user computing device to be used for authenticating the user during a future authentication session in lieu of the user entering user login credentials for authentication; and
   registering the user with the system in response to receipt of the confirmation code from the secondary user computing device.

2. The system of claim 1, wherein the initial candidate secret, reciprocal secret, and canonical secret are based on a Time-based One-time Password (TOTP) algorithm.

3. The method of claim 1, wherein the method further comprises, prior to transmitting the initial candidate secret, inviting the user to install at least one management system software application used for completing the registration process and the future authentication process.

4. The method of claim 1, wherein the token is used for OTP generation during the future authentication session.

5. The method of claim 1, wherein the traditional user login credentials comprise at least one of user identification information and a password.

6. The method of claim 5, wherein user identification information comprises at least one of a name of the user, a user ID, an email address of the user, and information likely to be known only to the user.

7. The method of claim 1, wherein the token comprises a built-in expiry date.

8. The method of claim 1, wherein the expiry date is associated with and controls a grant period during which the user can carry out an authentication session.

9. The method of claim 8, wherein the grant period and expiry date are determined by the entity.

10. The method of claim 1, wherein the future authentication process comprises:
   receiving an authentication session request from the entity, comprising at least one of a public session key and a private session key;
   detecting, via the secondary user computing device, the public session key;
   receiving one or more identifying secrets from the secondary user computing device based on detection of the public session key; and
   receiving an enquiry from the entity concerning an authentication result.

11. The method of claim 10, wherein the one or more identifying secrets comprises the token associated with the canonical secret.

12. The method of claim 10, wherein the method further comprises, upon receipt of a positive authentication result, granting user access to entity resources.

13. The method of claim 1, wherein the initial candidate secret comprises data associated with a QR code.

14. The method of claim 13, wherein transmitting the initial candidate secret to one of the primary and secondary user computing devices comprises displaying the QR code on a display of one of the primary and secondary user computing devices.

15. The method of claim 14, wherein interaction between the secondary user computing device and the initial candidate secret comprises a scanning event involving the QR code.

16. The method of claim 1, wherein the future authentication process comprises at least one of a biometric factor and a challenge-response factor, wherein a user is authenticated by satisfying at least one of the biometric and challenge-response factors.

17. The method of claim 16, wherein a user is authenticated by satisfying both the biometric and challenge-response factors.

18. The method of claim 16, wherein the biometric factor comprises at least one of a DNA sample, a fingerprint scan, a retina scan, a facial scan, a brain scan, an earlobe scan, a toeprint scan, a footprint scan, voice recognition, and speech recognition.

19. The method of claim 18, wherein the challenge-response factor comprises a passphrase.

20. The method of claim 19, wherein a user response to the challenge-response factor comprises a spoken response, which provides both a correct response and matches a biometric identification of a voice.

* * * * *